US012737762B2

(12) United States Patent
Malhotra et al.

(10) Patent No.: US 12,737,762 B2
(45) Date of Patent: Sep. 15, 2026

(54) METHOD AND SYSTEM FOR INTELLIGENTLY SETTLING BRIDGED TRANSACTIONS

(71) Applicant: MASTERCARD INTERNATIONAL INCORPORATED, Purchase, NY (US)

(72) Inventors: Aakarsh Malhotra, New Delhi (IN); Ashish Kumar, Lucknow (IN); Deepak Chaurasiya, Gorakhpur (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/736,500

(22) Filed: Jun. 6, 2024

(65) Prior Publication Data

US 2025/0378441 A1 Dec. 11, 2025

(51) Int. Cl.
*G06Q 20/40* (2012.01)

(52) U.S. Cl.
CPC .................................. *G06Q 20/401* (2013.01)

(58) Field of Classification Search
CPC .................................................... G06Q 20/401
See application file for complete search history.

(56) References Cited

U.S. PATENT DOCUMENTS 8,856,045 B1 * 10/2014 Patel .................. G06Q 20/3821 705/79
10,825,012 B1 * 11/2020 Senci ..................... G06N 20/00
10,915,900 B1 2/2021 Higgins et al.
10,963,885 B2 3/2021 Yerradoddi et al.
11,321,717 B2 5/2022 Kandasamy et al.
2011/0302079 A1 12/2011 Neuhaus
2017/0364879 A1 * 12/2017 Malhotra ............. G06Q 20/023
2018/0173768 A1 * 6/2018 Troisvallets ...... G06F 16/24564
2019/0266607 A1 * 8/2019 Mori ...................... G06N 5/046
2021/0081918 A1 3/2021 Jayachandran
2021/0103910 A1 * 4/2021 Subramaniam ...... G06Q 20/023
2021/0201303 A1 * 7/2021 Ajayi .................. G06Q 20/401
(Continued)

FOREIGN PATENT DOCUMENTS

WO 2021/096973 5/2021

*Primary Examiner* — Raven E Yono
(74) *Attorney, Agent, or Firm* — Barta Jones, PLLC

(57) ABSTRACT

Methods and systems for intelligently settling bridged transactions are disclosed. The method performed by a server system includes receiving a payment authorization message associated with an ongoing payment transaction from an issuer server. Here, the ongoing payment transaction is a bridged transaction with the issuer server operating in a single message system and an acquirer server operating in a dual message system. Method includes extracting a transaction feature set from the ongoing payment transaction and accessing a historical trend feature set from a database. Method includes generating, by one or more clearing prediction models associated with the server system, a clearing score for the ongoing payment transaction based, at least in part, on the transaction feature set and the historical trend feature set. Method includes transmitting a hold transaction message to the issuer server based, at least in part, on the clearing score being lower than a predefined threshold.

20 Claims, 10 Drawing Sheets

(56) References Cited

U.S. PATENT DOCUMENTS

2022/0366412 A1 11/2022 Mori et al.
2023/0088260 A1* 3/2023 Banerjee .............. G06Q 20/425 705/39
2023/0108170 A1* 4/2023 Vijayaraghavan ........................... G06Q 20/4012 705/72

* cited by examiner

METHOD AND SYSTEM FOR INTELLIGENTLY SETTLING BRIDGED TRANSACTIONS

TECHNICAL FIELD

The present disclosure relates to bridged transactions in a payment ecosystem and, more particularly, to electronic methods and complex processing systems for intelligently settling bridged transactions using Artificial Intelligence (AI)/Machine Learning (ML) techniques.

BACKGROUND

The payment ecosystem is made up of the four-party transaction framework that is responsible for facilitating secure and efficient financial exchange between various stakeholders within the ecosystem. The four-party transaction framework involves a cardholder, a merchant, an issuer, and an acquirer. Here, the issuer is the banking partner of the cardholder while the acquirer is the banking partner of the merchant. In the payment ecosystem, the cardholder initiates the payment transaction using a payment card associated with him/her with the merchant to purchase goods or avail of services offered by the merchant. In response, the merchant seeks authorization for the transaction from the cardholder's issuer through his/her acquirer. The acquirer presents the payment card information gathered by the merchant to the issuer, which in turn authenticates and settles the payment transaction. Generally, a payment gateway is used by the four-party model that is responsible for processing such transactions by establishing communication between different entities of the four-party model.

Conventionally, there exist three systems, standards, or formats through which such payment transactions are processed namely, single message system, double (dual) message system, and bridged transaction message system. In the single message system, the acquirer submits a single electronic message to a payment gateway. The single electronic message generally contains data required for authorization, clearing, and settlement of the transaction. In the dual-message system, the acquirer submits two electronic messages to the payment gateway at the time of purchase. The first electronic message contains information required for an authorization decision and the second message is shared later containing additional data required for clearing and settlement. In the bridge transaction message system, both the single-message system and the dual-message system are integrated seamlessly. The bridge transaction message system serves as a crucial mechanism for achieving interoperability and functional harmony within diverse financial infrastructures.

The bridged transaction message system facilitates the exchange of authorization, clearing, and settlement information between acquirers and issuers operating on different transaction message systems. Thus, acting as a bridge between dual and single-message paradigms. In this system, support is provided for a wide array of transaction types, including dual-to-dual, single-to-dual, and dual-to-single scenarios. As may be appreciated, the bridged transaction message system exemplifies a versatile approach to transaction processing in the ever-evolving landscape of electronic payments. This framework enhances the efficiency and compatibility of financial systems, ensuring the secure and reliable execution of electronic transactions across diverse networks and entities.

Despite its versatile nature, the bridge transaction message system faces various challenges as well. For instance, when transactions involve interactions between dual-message and single-message systems, sometimes the settlement still takes place even if the clearing message is not received. This aspect causes a problem since a lack of the clearing message from the acquirer indicates that the transaction could not be cleared thus, the funds received through settlement must be returned to the issuer. This return of funds is a complex and time-consuming process which can lead to further financial loss to the acquirer or the payment gateway holding the funds due to fluctuation in the currency exchange rate.

To that end, there exists a need for technical solutions such as methods and systems for enhancing the existing bridge transaction message system by intelligently settling bridge transactions, thereby overcoming the aforementioned technical drawbacks.

SUMMARY

Various embodiments of the present disclosure provide methods and systems for intelligently settling payment transactions in the bridge transaction message system.

In an embodiment, a computer-implemented method for intelligently settling bridge transactions is disclosed. The computer-implemented method performed by a server system includes receiving a payment authorization message associated with an ongoing payment transaction from an issuer server. Herein, the ongoing payment transaction is a bridged transaction with the issuer server operating in a single message system and an acquirer server operating in a dual message system. The computer-implemented method further includes extracting a transaction feature set from the ongoing payment transaction. The computer-implemented method further includes accessing a historical trend feature set from a database associated with the server system. The computer-implemented method further includes generating, by one or more clearing prediction models associated with the server system, a clearing score for the ongoing payment transaction based, at least in part, on the transaction feature set and the historical trend feature set. The computer-implemented method further includes transmitting a hold transaction message to the issuer server based, at least in part, on the clearing score being lower than a predefined threshold.

In another embodiment, a server system is disclosed. The server system includes a communication interface and a memory including executable instructions. The server system also includes a processor communicably coupled to the memory. The processor is configured to execute the instructions to cause the server system, at least in part, to receive a payment authorization message associated with an ongoing payment transaction from an issuer server. Herein, the ongoing payment transaction is a bridged transaction with the issuer server operating in a single message system and an acquirer server operating in a dual message system. The server system is further caused to extract a transaction feature set from the ongoing payment transaction. The server system is further caused to access a historical trend feature set from a database associated with the server system. The server system is further caused to generate, by one or more clearing prediction models associated with the server system, a clearing score for the ongoing payment transaction based, at least in part, on the transaction feature set and the historical trend feature set. The server system is further caused to transmit a hold transaction message to the issuer server based, at least in part, on the clearing score being lower than a predefined threshold.

In yet another embodiment, a non-transitory computer-readable storage medium is disclosed. The non-transitory computer-readable storage medium includes computer-executable instructions that, when executed by at least a processor of a server system, cause the server system to perform a method. The method includes receiving a payment authorization message associated with an ongoing payment transaction from an issuer server. Herein, the ongoing payment transaction is a bridged transaction with the issuer server operating in a single message system and an acquirer server operating in a dual message system. The method further includes extracting a transaction feature set from the ongoing payment transaction. The method further includes accessing a historical trend feature set from a database associated with the server system. The method further includes generating, by one or more clearing prediction models associated with the server system, a clearing score for the ongoing payment transaction based, at least in part, on the transaction feature set and the historical trend feature set. The method further includes transmitting a hold transaction message to the issuer server based, at least in part, on the clearing score being lower than a predefined threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present technology, reference is now made to the following descriptions taken in connection with the accompanying drawings in which.

Figure 1:
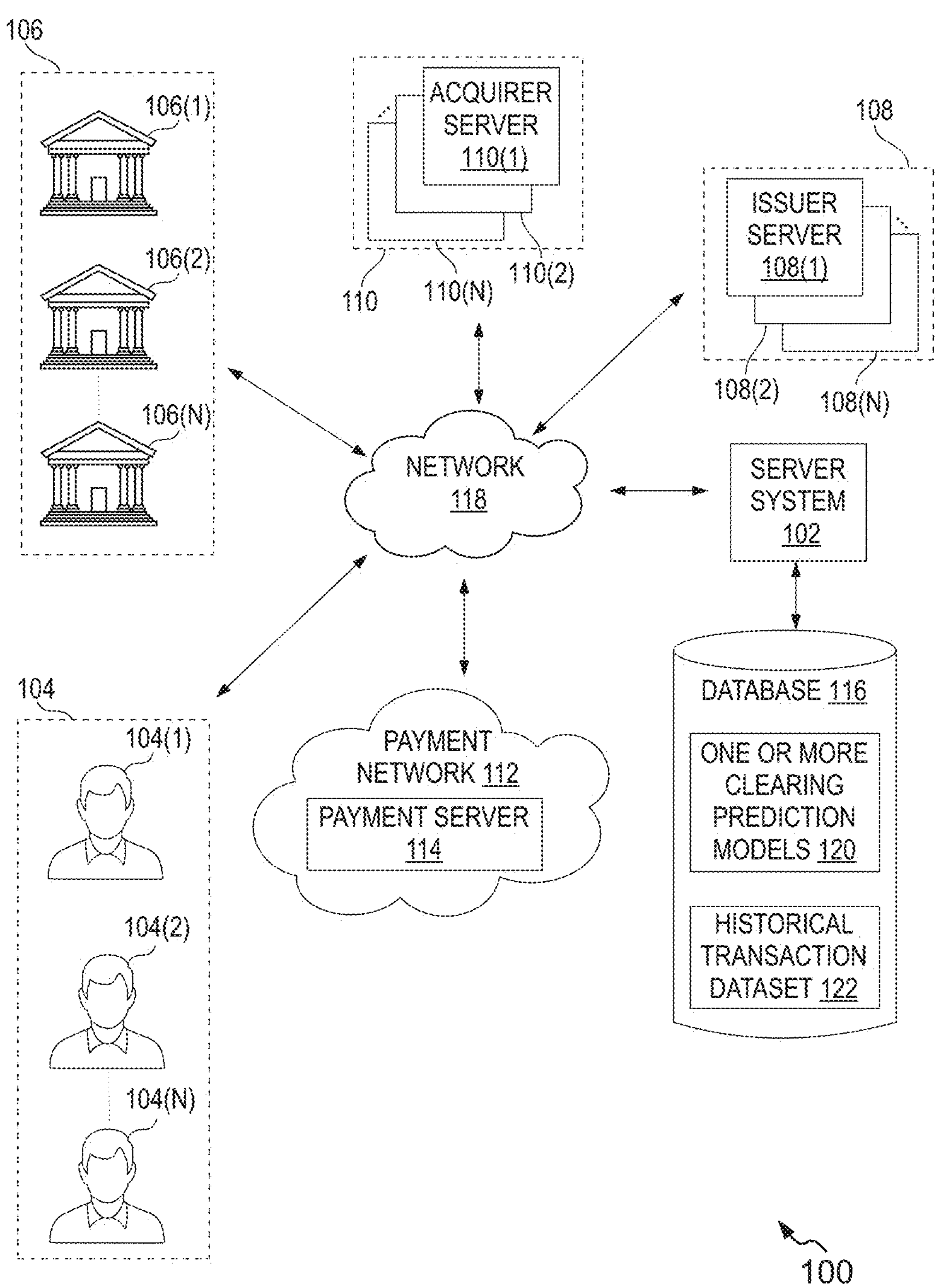
FIG. 1 illustrates a schematic representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Embodiments of the present disclosure may be embodied as an apparatus, a system, a method, or a computer program product. Accordingly, embodiments of the present disclosure may take the form of an entire hardware embodiment, an entire software embodiment (including firmware, resident software, micro-code, etc.), or an embodiment combining software and hardware aspects that may all generally be referred to herein as a "circuit", "engine", "module", or "system". Furthermore, aspects of the present disclosure may take the form of a computer program product embodied in one or more computer-readable storage media having computer-readable program code embodied thereon.

The terms "account holder", "user", "cardholder", "consumer", "card" and "buyer" are used interchangeably throughout the description and refer to a person who has a payment account or a payment card (e.g., credit card, debit card, etc.) associated with the payment account, that will be used by a merchant to perform a payment transaction. The payment account may be opened via an issuing bank or an issuer server.

The term "merchant", used throughout the description generally refers to a seller, a retailer, a purchase location, an organization, or any other entity that is in the business of selling goods or providing services, and it can refer to either a single business location or a chain of business locations of the same entity. For example, the merchants may include buyers and sellers of commodities for profit, traders, a storekeeper, health care centers, hotels, restaurants, vehicle rentals, petrol/gas stations, etc.

The terms "payment network" and "card network" are used interchangeably throughout the description and refer to a network or collection of systems used for the transfer of funds through the use of cash substitutes. Payment networks may use a variety of different protocols and procedures to process the transfer of money for various types of transactions. Payment networks are companies that connect an issuing bank with an acquiring bank to facilitate online payment. Transactions that may be performed via a payment network may include product or service purchases, credit purchases, debit transactions, fund transfers, account withdrawals, etc. Payment networks may be configured to perform transactions via cash substitutes that may include payment cards, letters of credit checks, financial accounts, etc. Examples of networks or systems configured to perform as payment networks include those operated by such as Mastercard®.

The term "payment card", used throughout the description, refers to a physical or virtual card linked with a financial or payment account that may be presented to a merchant or any such facility to fund a financial transaction via the associated payment account. Examples of the payment card include, but are not limited to, debit cards, credit cards, prepaid cards, virtual payment numbers, virtual card numbers, forex cards, charge cards, e-wallet cards, and stored-value cards. A payment card may be a physical card that may be presented to the merchant for funding the payment. Alternatively, or additionally, the payment card may be embodied in the form of data stored in a user device, where the data is associated with a payment account such that the data can be used to process the financial transaction between the payment account and a merchant's financial account. In some instances, while swiping the payment card at the merchant's end, the merchant can raise a preauthorization request to check the eligibility of the merchant to use the service that the cardholder is willing to receive from the merchant. In this case, the payment will not be made at the beginning of receiving the service, instead, it will be made upon completion of the service or at the time of checking out. Herein, the payment may or may not be the same as the amount requested in the preauthorization request.

The term "payment account" used throughout the description refers to a financial account that is used to fund a financial transaction. Examples of the financial account include, but are not limited to, a savings account, a credit account, a checking account, and a virtual payment account. The financial account may be associated with an entity such as an individual person, a family, a commercial entity, a company, a corporation, a governmental entity, a non-profit organization, and the like. In some scenarios, the financial account may be a virtual or temporary payment account that can be mapped or linked to a primary financial account, such as those accounts managed by payment wallet service providers, and the like.

The terms "payment transaction", "financial transaction", "event", and "transaction" are used interchangeably throughout the description and refer to a transaction of payment of a certain amount being initiated by the cardholder. More specifically, refers to electronic financial transactions including, for example, online payment, payment at a terminal (e.g., point of sale (POS) terminal, ATM, self-service kiosks, and the like. In the case of preauthorization, such a transaction may not happen before receiving the service, but instead at the time of the completion of receiving the service.

The terms "bridge transaction" or "bridged transaction", used throughout the description generally refer to a transaction taking place in the payment network using the bridge transaction message system. The term bridge transaction message system may be interchangeably referred to as 'bridged communication', 'bridged processing', or 'bridged protocol' throughout the description.

OVERVIEW

Various embodiments of the present disclosure provide methods, systems electronic devices, and computer program products for intelligently settling bridge transactions.

In an embodiment, the server system is configured to receive a payment authorization message associated with an ongoing payment transaction from an issuer server. Herein, the ongoing payment transaction is a bridged transaction with the issuer server operating in a single message system and an acquirer server operating in a dual message system. In some instances, the server system can be a payment server associated with a payment network.

In another embodiment, the server system is configured to extract a transaction feature set from the ongoing payment transaction. Herein, the transaction feature set includes at least a merchant category, a merchant industry, a transaction amount, a pre-authorization amount, and a Decision Intelligence (DI) score.

In another embodiment, the server system is configured to access a historical trend feature set from a database associated with the server system. In one implementation, the server system may access a historical transaction dataset from the database. Herein, the historical transaction dataset includes at least transaction-related information associated with a plurality of transactions performed by a plurality of cardholders with a plurality of merchants. Then, the server system generates the historical trend feature set based, at least in part, on the transaction-related information associated with a plurality of transactions. Further, the server system may store the historical trend feature set in the database to be accessed later.

In various examples, the historical trend feature set includes at least metrics related to at least one of bridging transactions associated with a cardholder, a merchant, and an issuer, percentage of disputes associated with the cardholder, merchant, and issuer, percentage of disputes in bridging transactions associated with the cardholder, merchant, and issuer, percentage of refunds associated with the cardholder and merchant, percentage of disputes and refunds between the cardholder and merchant, percentage of chargeback, representment, and case phase disputes associated with the cardholder, percentage of chargeback, representment, and case phase disputes in bridging transactions associated with the cardholder, percentage of chargeback, representment, and case phase disputes associated with the merchant in a particular time range to a plurality of cardholders, a plurality of merchants, a plurality of issuer servers, and a plurality of acquirer servers.

In another embodiment, the server system is configured to generate, by one or more clearing prediction models associated with the server system, a clearing score for the ongoing payment transaction based, at least in part, on the transaction feature set and the historical trend feature set. In an example, each model of the one or more clearing prediction models is a decision tree-based Machine Learning model. To generate the clearing score, the server system is configured to determine, by at least one model from the one or more clearing prediction models, a transaction clearance likelihood score based, at least in part, on the transaction feature set and the historical trend feature set. Then, the server system is configured to determine, by at least another model from the one or more clearing prediction models, a transaction dispute likelihood score based, at least in part, on the transaction feature set and the historical trend feature set. Further, the server system is configured to compute the clearing score based, at least in part, on the transaction clearance likelihood score and the transaction dispute likelihood score.

In another embodiment, the server system is configured to transmit a hold transaction message to the issuer server based, at least in part, on the clearing score being lower than a predefined threshold. In an alternative embodiment, the server system is configured to transmit a settlement initiation message to the issuer server based, at least in part, on the clearing score being at least equal to the predefined threshold. In some examples, the hold transaction message and the settlement initiation message are Application Programming Interface (API) messages.

In another embodiment, the server system is configured to receive a transaction clearing message for the ongoing payment transaction from the acquirer server. In response to receiving the transaction clearing message, the server system is configured to transmit a settlement initiation message to the issuer server.

Various embodiments of the present disclosure offer multiple advantages and technical effects. For instance, the present disclosure provides a novel process for settling bridge transactions in an efficient manner. As may be appreciated, various embodiments of the present disclosure enable the server system to hold the settlement process for an ongoing payment transaction if there exists a high likelihood that the said ongoing payment transaction will not be cleared by the acquirer. This aspect prevents the transfer of funds from the issuer to the card scheme network or the payment network while also eliminating the need to return the funds when the said ongoing payment transaction is eventually not cleared. Further, this approach ensures that the success rate of the transactions improves since settlement is done for only those transactions that have a high likelihood of being cleared.

To conclude, the approach of the present disclosure solves the technical problem faced by the bridged messaging system by generating the clearing score and reliably informing the issuer if they should proceed with the settlement process or put it on hold till the transaction clearing message is received from the acquirer. Thus, eliminating the need for conventional error handling and exception processing of the bridge messaging system, thereby reducing the existing complexity. Further, financial losses due to variations in the foreign currency exchange rate (i.e., currency conversion costs) can also be avoided.

Various example embodiments of the present disclosure are described hereinafter with reference to FIGS. 1 to 8.

FIG. 1 illustrates a block diagram representation of an environment 100 related to at least some example embodiments of the present disclosure. Although the environment 100 is presented in one arrangement, other embodiments may include the parts of the environment 100 (or other parts) arranged otherwise depending on, for example, facilitating the settlement of payment transactions within the payment network 112, facilitating the issuer to hold or delay the settlement process, and so on.

The environment 100 generally includes a plurality of entities such as a server system 102, a plurality of cardholders 104(1), 104(2), . . . 104(N), where 'N' is a non-zero natural number (collectively referred to as a 'plurality of cardholders 104' or 'cardholders 104' or singularly as 'cardholder 104(1)'), a plurality of merchants 106(1), 106(2), . . . 106(N) where 'N' is a non-zero natural number (collectively referred to as a 'plurality of merchants 106' or 'merchants 106' or singularly as 'merchant 106(1)'), a plurality of issuer servers 108(1), 108(2), . . . 108(N), where 'N' is a non-zero natural number (collectively referred to as a 'plurality of issuer servers 108' or 'issuer servers 108' or singularly as 'issuer server 108(1)'), a plurality of acquirer servers 110(1), 110(2), . . . , 110(N), where 'N' is a non-zero natural number (collectively referred to as a 'plurality of acquirer servers 110' or 'acquirer servers 110' or singularly as 'acquirer server 110(1)'), a payment network 112 including a payment server 114, and a database 116 each coupled to, and in communication with (and/or with access to) a network 118.

In various examples, the network 118 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 118 in accordance with various wired and wireless communication protocols, such as Transmission Control Protocol and Internet Protocol (TCP/IP), User Datagram Protocol (UDP), 2nd Generation 2G), 3rd Generation 3G), 4th Generation 4G), 5th Generation 5G) communication protocols, Long Term Evolution (LTE) communication protocols, New Radio (NR) communication protocol, any future communication protocol, or any combination thereof. In some instances, the network 118 may utilize a secure protocol (e.g., Hypertext Transfer Protocol (HTTP), Secure Socket Lock (SSL), and/or any other protocol, or set of protocols for communicating with the various entities depicted in FIG. 1.

In an embodiment, the cardholders 104 use one or more payment cards (not shown) to make payment transactions. As may be understood, the cardholder (e.g., the cardholder 104(1)) may be any individual, representative of a corporate entity, a non-profit organization, or any other person who is presenting payment account details during an electronic payment transaction. The cardholder (e.g., the cardholder 104(1)) may have a payment account issued by an issuing bank (not shown in figures) associated with the issuer server 108 and may be provided with a payment card with financial or other account information encoded onto the payment card such that the cardholder (i.e., the cardholder 104(1)) may use the payment card to initiate and complete a payment transaction using a bank account at the issuing bank.

In another embodiment, the cardholders 104 may use their corresponding electronic devices (not shown) to access a mobile application or a website associated with the issuing bank, or any third-party payment application to perform a payment transaction. In various non-limiting examples, the electronic devices may refer to any electronic devices such as, but not limited to, personal computers (PCs), tablet devices, smart wearable devices, Personal Digital Assistants (PDAs), voice-activated assistants, Virtual Reality (VR) devices, smartphones, laptops, and the like.

In an embodiment, the merchants 106 may include retail shops, restaurants, supermarkets or establishments, government and/or private agencies, or any such places equipped with POS terminals, where cardholders 104 visit for performing the financial transaction in exchange for any goods and/or services or any financial transactions.

In one scenario, the cardholders 104 may use their corresponding payment accounts to conduct payment transactions with the merchants 106. Moreover, it may be noted that each of the cardholders 104 may use their corresponding payment cards differently or make the payment transaction using different means of payment. The term "payment transaction" refers to an agreement that is carried out between a buyer and a seller to exchange goods or services in exchange for assets in the form of a payment (e.g., cash, fiat-currency, digital asset, cryptographic currency, coins, tokens, etc.).

For instance, the cardholder 104(1) may enter payment account details on an electronic device (not shown) associated with the cardholder 104(1) to perform an online payment transaction via a payment gateway associated with the merchant's website. In another example, the cardholder 104(2) may utilize the payment card to perform an offline payment transaction using a Point Of Sale (POS) device at the merchant's store. In yet another example, the cardholder 104(3) may enter details of the payment card to transfer funds in the form of fiat currency on an e-commerce platform to buy goods. In other words, each cardholder of the plurality of cardholders 104 (e.g., the cardholder 104(1)) may transact at any merchant from the plurality of merchants 106 (e.g., the merchant 106(1)).

In one embodiment, the cardholders 104 are associated with the issuer servers 108. In one embodiment, the issuer servers 108 are associated with financial institutions normally called an "issuer bank", "issuing bank" or simply "issuer", in which a cardholder (e.g., the cardholder 104(1)) may have the payment account, (which also issues a payment card, such as a credit card or a debit card), and provides microfinance banking services (e.g., payment transaction using credit/debit cards) for processing electronic payment transactions, to the cardholder (e.g., the cardholder 104(1)).

In an embodiment, the merchants 106 are generally associated with the acquirer servers 110. In one embodiment, the acquirer servers 110 are associated with financial institutions (e.g., a bank) that process financial transactions for the merchants 106. This can be an institution that facilitates the processing of payment transactions for physical stores, merchants, or institutions that own platforms that make either online purchases or purchases made via software applications possible. The terms "acquirer", "acquiring bank", "acquiring bank" or "acquirer server" will be used interchangeably herein.

In one embodiment, the payment network 112 may be used by the payment card issuing authorities as a payment interchange network. Examples of the payment cards include debit cards, credit cards, etc. Similarly, examples of payment interchange networks include but are not limited to, a Mastercard® payment system interchange network. The Mastercard® payment system interchange network is a proprietary communications standard promulgated by Mastercard International Incorporated® for the exchange of electronic payment transaction data between issuers and acquirers that are members of Mastercard International Incorporated®. (Mastercard is a registered trademark of Mastercard International Incorporated located in Purchase, N.Y.). The payment network 112 includes the payment server 114 which is responsible for facilitating the various operations of the payment network 112. In one scenario, the payment server 114 is configured to operate a payment gateway for facilitating the various entities in the payment network 112 to perform digital transactions.

As described earlier, the four-party transaction framework is the backbone of the payment network 112. There are three standard systems or paradigms for processing payment transactions within the four-party transaction framework, i.e., the single message system, the double message system, and the bridged transaction message system.

In the single message system, payment authorization and clearing (or presentment) are performed using the same message via the card scheme network (such as Mastercard Debit Switch (MDS)®) or the payment network 112. On the other hand, in the double message system, payment authorization and clearing (or presentment) are performed using different messages such as the payment authorization request message and transaction clearing message. This separation allows for distinct steps in the transaction lifecycle-authorization to confirm the validity of the transaction and clearing to settle the transaction amount. The payment authorization request message is shared by the acquirer server 110 with the issuer server 108 of the cardholder 104 to authenticate the identity of the cardholder 104. Upon successful authentication, the issuer server 108 transmits a payment authentication message to the acquirer server 110. Upon determining that the cardholder authentication is successful, the acquirer server 110 transmits the transaction clearing message to the issuer server 108 for clearing the transaction. In response the issuer server 108 is configured to settle the transaction, in other words, transfer the funds to the acquirer server 110. Herein, the transaction clearing message enables the issuer server and the acquirer server to reconcile and confirm the financial obligations between the financial institutions (i.e., the issuer bank and the acquirer bank) associated with the issuer server 108 and the acquirer server 110, respectively. This allows for accurate record-keeping of transactions. During this phase, transaction details are matched, and net positions are determined, thereby streamlining the verification of payment instructions.

Further, during settlement, the actual transfer of funds or securities is done to fulfill these financial obligations. It is the final step in the transaction life cycle where the financial assets move from the payer to the payee. The efficiency and accuracy of these processes are paramount for maintaining the stability and trustworthiness of the broader financial ecosystem, providing the necessary foundation for secure and transparent electronic transactions on a global scale. The time it takes for actual settlement in financial transactions may vary depending on various factors, including the type of transaction, the financial instruments involved, the payment system or network used, and the specific procedures of the financial institutions participating in the transaction. Settlement times may range from near instantaneous to 3 days or in some cases up to 50 days.

In a single-message system, the authorization request and the financial details are typically combined into a single message. This integrated message is sent to the issuer server 108 for both authorization and clearing purposes. Therefore, in a single-message system, the term "clearing" may not be explicitly separated as it is in dual-message systems. In the single-message system, the authorization request itself often serves the dual purpose of both authorization and clearing. The issuer server 108 processes the integrated message, authorizes the transaction and handles the necessary steps for clearing and settlement in one go.

In the bridged messaging system, transactions involve interactions between dual-message and single-message systems, where the absence of a separate clearing message may cause an issue if the settlement still occurs in some instances. The specific processes and protocols can vary depending on the implementation and the payment network 112 involved. Bridged systems have mechanisms for error handling and exception processing. If a clearing message is somehow missed, the system may have to rely on fallback procedures or reconciliation processes to address such situations, which are time-consuming and involve complexity. Some example situations include the cardholder 104(1) raising a dispute/chargeback personally, variation in interchange calculation and currency conversion, and undoing the whole transaction when card schemes (e.g. Mastercard) received funds from an issuer but an acquirer never asked for it (this occurs when the issuer operating in single message system settles the transaction without receiving the transaction clearing message from the acquirer operating in dual message system).

The above-mentioned technical problems, among other problems, are addressed by one or more embodiments implemented by the server system 102 and methods thereof provided in the present disclosure.

In one embodiment, the server system 102 is configured to intelligently facilitate the settlement of bridge transactions by either holding or delaying transactions that are likely to remain unclear.

In some embodiments, the server system 102 may be deployed as a standalone server or may be implemented in the cloud as software as a service (SaaS). In one embodiment, the environment 100 may further include a database 116 coupled with the server system 102. In an example, the server system 102 coupled with the database 116 is embodied within the payment server 114, however, in other examples, the server system 102 can be a standalone component (acting as a hub) connected to the acquirers 110 and the issuers 108. The database 116 may be incorporated in the server system 102 or may be an individual entity connected to the server system 102 or may be a database stored in cloud storage. In one embodiment, the database 116 may store one or more clearing prediction models 120, historical transaction dataset 122, and other necessary machine instructions required for implementing the various functionalities of the server system 102 such as firmware data, operating system, and the like.

In various non-limiting examples, the database 116 may include one or more Hard Disk Drives (HDD), Solid-State Drives (SSD), an Advanced Technology Attachment (ATA) adapter, a Serial ATA (SATA) adapter, a Small Computer System Interface (SCSI) adapter, a redundant array of independent disks (RAID) controller, a Storage Area Network (SAN) adapter, a network adapter, and/or any component providing the server system 102 with access to the database. In one implementation, the database may be viewed, accessed, amended, updated, and/or deleted by an administrator (not shown) associated with the server system 102 through a database management system (DBMS) or relational database management system (RDBMS) present within the database 116.

In other various examples, the database may also include multifarious data, for example, social media data, Know Your Customer (KYC) data, payment data, trade data, employee data, Anti Money Laundering (AML) data, market abuse data, Foreign Account Tax Compliance Act (FATCA) data, and fraudulent payment transaction data. In addition, the database provides a storage location for data and/or metadata obtained from various operations performed by the server system 102.

In an embodiment, the historical transaction dataset 122 may include transaction-related information related to a plurality of payment transactions performed between a plurality of cardholders 104 with a plurality of merchants 106 within the payment network 112. The historical transaction dataset may include but is not limited to, transaction-related information, such as transaction amount, source of funds such as bank or credit cards, transaction channel used for loading funds such as POS terminal or ATM, transaction velocity features such as count and transaction amount sent in the past 'x' number of days to a particular user or cardholder, transaction location information, external data sources, merchant country, merchant Identifier (ID), cardholder ID, cardholder product, cardholder Permanent Account Number (PAN), Merchant Category Code (MCC), merchant location data or merchant co-ordinates, merchant name, city, zip code merchant industry, merchant super industry, ticket price or ticket Size, number of unique cards, location, transaction channel (POS/Ecomm/Cash), product code and other transaction-related data. The historical transaction dataset 122 may be used by the server system 102 to generate a historical trend feature set using one or more featurization techniques.

In an embodiment, the one or more clearing prediction models 120 may refer AI or ML models that are configured to determine the likelihood of receiving a clearance message for an ongoing payment transaction by generating a clearing score. In various non-limiting examples, the one or more clearing prediction models 120 may include Decision Tree based ML models or algorithms such as eXtreme Gradient Boosting (XGBoost), Catboost (Categorical Boosting), LightGBM (Gradient Boosting Machines), Random Forest, DNN (Deep Neural Network) models, and the like.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device is shown in FIG. 1 may be implemented as multiple, distributed systems or devices. In addition, the server system 102 should be understood to be embodied in at least one computing device in communication with the network 118, which may be specifically configured, via executable instructions, to perform steps as described herein, and/or embodied in at least one non-transitory computer-readable media.

In an embodiment, the server system 102 is configured to receive a payment authorization message associated with an ongoing payment transaction from the issuer server 108. Herein, the ongoing payment transaction is a bridged transaction initiated by the cardholder 104 with the merchant 106. Further, the issuer server 108 of the cardholder 104 is operating in a single message system and the acquirer server 110 of the merchant 106 is operating in a dual message system.

Then, the server system 102 is configured to extract a transaction feature set from the ongoing payment transaction. It is understood that the payment authorization message includes information related to the ongoing payment transaction. This information can be utilized by the server system 102 to extract authorization features, otherwise known as the transaction feature set for the ongoing payment transaction. In various non-limiting examples, the transaction feature set includes at least one of features such as a merchant category, a merchant industry, a transaction amount, a pre-authorization amount, a Decision Intelligence (DI) score, and so on.

Then, the server system 102 is configured to access the historical trend feature set from the database 116. In various examples, the historical trend feature set includes at least one of metrics (such as percentage, aggregate, average and so on) related to at least one of bridging transactions associated with a cardholder, a merchant, and an issuer, percentage of disputes associated with the cardholder, merchant, and issuer, percentage of disputes in bridging transactions associated with the cardholder, merchant, and issuer, percentage of refunds associated with the cardholder and merchant, percentage of disputes and refunds between the cardholder and merchant, percentage of chargeback, representment, and case phase disputes associated with the cardholder, percentage of chargeback, representment, and case phase disputes in bridging transactions associated with the cardholder, percentage of chargeback, representment, and case phase disputes associated with the merchant in a particular time range to a plurality of cardholders, a plurality of merchants, a plurality of issuer servers 108, and a plurality of acquirer servers 110.

In an instance, for training and prediction purposes the historical trend feature set may be segregated into a historical authentication feature set and a historical dispute feature set. In a non-limiting example, the historical authentication feature set may include, but is not limited to, a percentage of bridging transaction associated with cardholders, merchants, issuers, and acquirers; an overall approval rate, an overall decline rate, an overall clearing rate associated with cardholders, merchants, issuers, and acquirers; and an approval rate, a decline rate, a clearing rate for bridging transactions associated with cardholders, merchants, issuers, and acquirers. In a non-limiting example, the historical dispute feature set may include, but is not limited to, an overall dispute rate, an overall chargeback rate, an overall representment rate, an overall case phase disputes percentage associated with cardholders, merchants, issuers, and acquirers; and a dispute rate, a chargeback rate, a representment rate, case phase disputes percentage for bridging transactions associated with cardholders, merchants, issuers, and acquirers.

Further, the server system 102 is configured to generate a clearing score for the ongoing payment transaction based, at least in part, on the transaction feature set and the historical trend feature set. More specifically, the server system 102 is configured to utilize the one or more clearing prediction models 120 to generate the clearing score for the ongoing payment transaction. Herein, the clearing score may indicate a probability of the ongoing payment transaction to end up being cleared or face a dispute in future.

Thereafter, the server system 102 is configured to generate and transmit a hold transaction message to the issuer server 108 based, at least in part, on the clearing score being lower than a predefined threshold. In an example, the hold transaction message may inform the issuer server 108 that there is a high likelihood that the transaction may end up being uncleared by the acquirer server 110. Alternatively, if the clearing score is at least equal to the predefined threshold, the server system 102 is configured to transmit a settlement initiation message to the issuer server 108. In an example, the settlement initiation message may inform the issuer server 108 that there is a high likelihood that the transaction may end up being cleared by the acquirer server 110. The term 'predefined threshold' may refer to a threshold value of the clearing score that can be defined by an administrator of the server system 102. The predefined threshold allows the administrator to define a policy or relevant value or values that may be used for segregating a high clearance probability from a low clearance probability. In other words, the predefined threshold signifies a predefined benchmark, or a calculated value used to evaluate certain conditions or parameters. In the context of the transaction processing discussed earlier, this term indicates a set criterion or a dynamically determined limit that determines whether a transaction is likely to be associated with a clearance or a dispute in a bridged transaction. This threshold is established based on various factors, including historical transaction data, customer behavior patterns, and merchant characteristics. By comparing relevant metrics against this threshold, such as e.g. likelihood of refund requests, informed decisions can be made regarding the delay or processing of transaction actual settlement, thereby optimizing the payment processing workflow and potentially reducing associated risks and costs.

It should be noted that the predefined threshold may define within itself different threshold values for transaction clearance determination model (i.e., the first ML model) and the transaction dispute determination model (i.e., the second model). For ease of understanding, these threshold values may be called first threshold and second threshold. In other words, the predefined threshold may include the first threshold value and the second threshold value.

Figure 2:
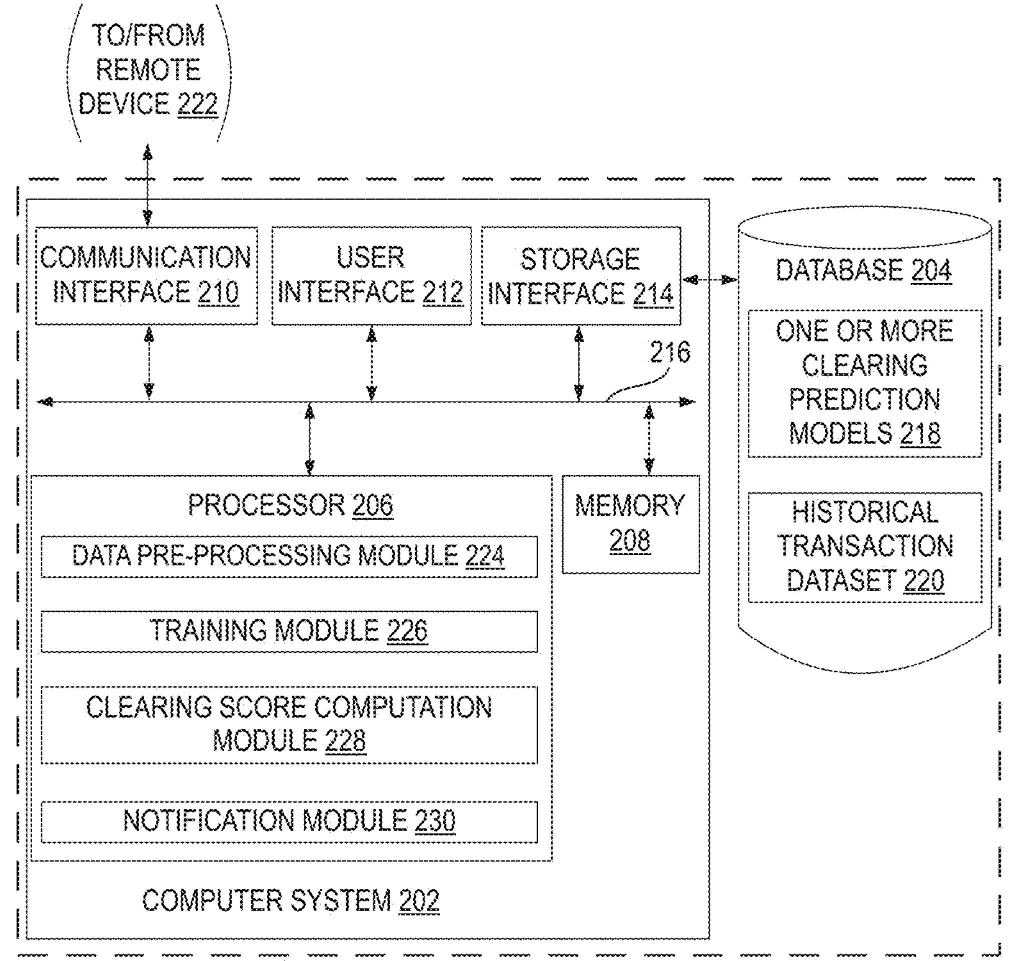
FIG. 2 illustrates a simplified block diagram of a server system, in accordance with an embodiment of the present disclosure.
Figure 2:

FIG. 2 illustrates a simplified block diagram of a server system 200, in accordance with an embodiment of the present disclosure. The server system 200 is identical to the server system 102 of FIG. 1. In one embodiment, the server system 200 is a part of the payment network 112 or integrated within the payment server 114. In some embodiments, the server system 200 is embodied as a cloud-based and/or SaaS-based (software as a service) architecture.

The server system 200 includes a computer system 202 and a database 204. The computer system 202 includes at least one processor 206 for executing instructions, a memory 208, a communication interface 210, a user interface 212, and a storage interface 214. The one or more components of the computer system 202 communicate with each other via a bus 216. The components of the server system 200 provided herein may not be exhaustive and the server system 200 may include more or fewer components than those depicted in FIG. 2. Further, two or more components depicted in FIG. 2 may be embodied in one single component, and/or one component may be configured using multiple sub-components to achieve the desired functionalities.

In some embodiments, the database 204 is integrated into the computer system 202. In one non-limiting example, the database 204 is configured to store one or more clearing prediction models 218, a historical transaction dataset 220 among other relevant instructions for operating the server system 200. Herein, the one or more clearing prediction models 218 and the historical transaction dataset 220 are identical to the one or more clearing prediction models 120 and the historical transaction dataset 122 of FIG. 1

In an embodiment, the computer system 202 may include one or more hard disk drives as the database 204. The user interface 212 is an interface such as a Human Machine Interface (HMI) or a software application that allows users such as an administrator (not shown) to interact with and control the server system 200 or one or more parameters associated with the server system 200. It may be noted that the user interface 212 may be composed of several components that vary based on the complexity and purpose of the application. Examples of components of the user interface 212 may include visual elements, controls, navigation, feedback and alerts, user input and interaction, responsive design, user assistance and help, accessibility features, and the like. More specifically these components may correspond to icons, layout, color schemes, buttons, sliders, dropdown menus, tabs, links, error/success messages, mouse and touch interactions, keyboard shortcuts, tooltips, screen readers, and the like.

In an embodiment, the storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute operations for forecasting a likelihood of a transaction clearance and/or a transaction dispute, determining whether to delay (i.e., put on hold) or initiate settlement based on the likelihood score of the transaction. Examples of the processor 206 include, but are not limited to, an application-specific integrated circuit (ASIC) processor, a reduced instruction set computing (RISC) processor, a graphical processing unit (GPU), a complex instruction set computing (CISC) processor, a field-programmable gate array (FPGA), and the like.

The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 200, without departing from the scope of the present disclosure.

The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 200, without departing from the scope of the present disclosure.

The processor 206 is operatively coupled to the communication interface 210, such that the processor 206 is capable of communicating with a remote device 222 such as the issuer servers 108, the acquirer servers 110, the payment server 114, or communicating with any entity connected to the network 118 (as shown in FIG. 1.)

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2. It should be noted that the server system 200 is identical to the server system 102 described in reference to FIG. 1.

In one implementation, the processor 206 includes a data pre-processing module 224, a training module 226, a clearing score computation module 228, and a notification module 230 in reference to FIG. 2. It should be noted that components, described herein, such as the data pre-processing module 224, the training module 226, the clearing score computation module 228, and the notification module 230 can be configured in a variety of ways, including electronic circuitries, digital arithmetic, and logic blocks, and memory systems in combination with software, firmware, and embedded technologies.

In an embodiment, the data pre-processing module 224 includes suitable logic and/or interfaces for receiving a payment authorization message associated with an ongoing payment transaction from an issuer server such as issuer server 108(1). In particular, initially the cardholder 104(1) performs a transaction at the merchant 106(1) with a payment card. The merchant 106(1) transmits the payment card information along with relevant authentication information to the acquirer server 110(1). Then, the acquirer server 110(1) transmits a payment authorization request message to the issuer server 108(1). The issuer servers perform various authentication processes such as two factor authentication to determine the validity of the cardholder presenting the payment card. If the authentication is successful, the issuer transmits the authentication successful message as the payment authentication response message (simply, the payment authorization message) with a payment successful flag to the acquirer server 110(1) via the payment server 114. In a particular implementation, the issuer server may transmit the payment authorization message to the server system 200 as well. It is noted that in this exemplary scenario, the ongoing payment transaction is a bridged transaction with the issuer server operating in a single message system and an acquirer server operating in a dual message system. As may be appreciated, the transaction system of the acquirer server 110(1) and issuer server 108(1) may reverse for different cardholders and merchants respectively. The payment authorization message may include transaction related information associated with the ongoing payment transaction.

Further, the data pre-processing module 224 is configured to extract a transaction feature set from the ongoing payment transaction. In particular, the data pre-processing module 224 utilizes the transaction related information associated with the ongoing payment transaction to extract or generate the transaction feature set. In some instances, the data pre-processing module 224 may utilize existing featurization techniques such as one-hot encoding, logarithmic transformation, binning, and so on. It is noted that since these techniques are well-known in the art, they have not been explained here for the sake of brevity.

Further, the data pre-processing module 224 is configured to access the historical transaction dataset 220 from the database 204. The historical transaction dataset may include at least the transaction-related information associated with a plurality of transactions performed by a plurality of cardholders 104 with a plurality of merchants 106. In some instances, the historical transaction dataset 220 may also be called merchant-cardholder interaction data. The historical transaction dataset 220 may include but is not limited to, one or more transaction attributes, such as transaction amount, source of funds such as bank or credit cards, transaction channel used for loading funds such as POS terminal or ATM, transaction velocity features such as count and transaction amount sent in the past 'x' number of days to a particular cardholder, transaction location information, external data sources, merchant country, merchant Identifier (ID), cardholder ID, cardholder product, cardholder Permanent Account Number (PAN), Merchant Category Code (MCC), merchant location data or merchant co-ordinates, merchant name, city, zip code merchant industry, merchant super industry, ticket price or ticket Size, number of unique cards, location, transaction channel (POS/Ecomm/Cash), product code and other transaction-related data. Then, the data pre-processing module 224 is configured to generate the historical trend feature set based, at least in part, on the transaction-related information associated with a plurality of transactions. In one instance, the data pre-processing module 224 may store the historical trend feature set in the database 204. Then the stored historical trend feature set may be utilized later on by the server system 200 for performing different operations.

In an embodiment, the historical trend feature set may include at least: percentage of bridging transactions associated with the payment card (or cardholder 104), the merchant 106, and the issuer server 108, percentage of disputes associated with the payment card (or cardholder), merchant 106, and issuer server 108, percentage of disputes in bridging transactions associated with the payment card (or cardholder 104), merchant 106, and issuer server 108, percentage of refunds associated with the payment card (or cardholder 104) and merchant 106, percentage of disputes and refunds between the cardholder 104 and the merchant 106, percentage of chargeback, representment, and case phase disputes associated with the payment card, percentage of chargeback, representment, and case phase disputes in bridging transactions associated with the payment card, percentage of chargeback, representment, and case phase disputes associated with the merchant in a particular or a requested or a required time range, e.g., previous quarter, date range, financial year, and the like corresponding to the plurality of cardholders 104, the plurality of merchants 106, the plurality of issuer servers 108, and the plurality of acquirer servers 110.

In yet another embodiment, the historical trend feature set may further include at least: an aggregate of bridging transactions associated with the cardholder 104, the merchant 106, and the issuer server 108, percentage of disputes associated with the cardholder 104, merchant 106, and issuer server 108, percentage of disputes in bridging transactions associated with the cardholder 104, merchant 106, and issuer server 108(1), percentage of refunds associated with the cardholder 104 and merchant 106, percentage of disputes and refunds between the cardholder 104 and the merchant 106, percentage of chargeback, representment, and case phase disputes associated with the cardholder 104, percentage of chargeback, representment, and case phase disputes in bridging transactions associated with the cardholder 104, percentage of chargeback, representment, and case phase disputes associated with the merchant 106 in a particular or a requested or a required time range, e.g., previous quarter, date range, financial year, and the like corresponding to the plurality of cardholders 104, the plurality of merchants 106, the plurality of issuer servers 108, and the plurality of acquirer servers 110.

Further, in an embodiment, the historical trend feature set may include at least: an average of bridging transactions associated with the cardholder 104, the merchant 106, and the issuer server 108(1), percentage of disputes associated with the cardholder 104, merchant 106, and issuer server 108(1), percentage of disputes in bridging transactions associated with the cardholder server 104, merchant 106, and issuer server 108(1), percentage of refunds associated with the cardholder 104 and merchant 106, percentage of disputes and refunds between the cardholder 104 and the merchant 106, percentage of chargeback, representment, and case phase disputes associated with the cardholder 104, percentage of chargeback, representment, and case phase disputes in bridging transactions associated with the cardholder 104, percentage of chargeback, representment, and case phase disputes associated with the merchant 106 in a particular or a requested or a required time range, e.g., previous quarter, date range, financial year, and the like corresponding to the plurality of cardholders 104, the plurality of merchants 106, the plurality of issuer servers 108, and the plurality of acquirer servers 110.

In some embodiments, before the generation of the features, the data pre-processing module 224 may be configured to gather data samples and store them in the historical transaction dataset 220. Further, the data pre-processing module 224 may be configured to perform pre-processing steps such as handling missing values, scaling the features, encoding categorical variables, and splitting the data into training and testing sets as well. In some other embodiments, upon generating the different feature sets, the data pre-processing module 224 may be configured to select a subset of relevant features from the plurality of features for reducing dimensionality and improving model's efficiency and generalization.

Further, the different feature sets may include the plurality of cardholder-related features corresponding to each cardholder (e.g., the cardholder 104(1)) of the cardholders 104, the plurality of merchant-related features corresponding to each merchant (e.g., the merchant 106(1)) of the merchants 106, the plurality of acquirer-related features corresponding to each acquirer (e.g., the acquirer server 110(1)) of the acquirer servers 110 and the plurality of issuer-related features corresponding to each issuer (e.g., the issuer server 108(1)) of the issuer servers 108.

In another embodiment, the data pre-processing module 224 is communicably coupled to the training module 226 and the clearing score computation module 228 and is configured to transmit the transaction feature set and the historical trend feature set to the training module 226 and the clearing score computation module 228.

In an embodiment, the training module 226 includes suitable logic and/or interfaces for training the one or more clearing prediction models 218 based on the historical transaction dataset 220. It is noted that the training or learning process of the one or more clearing prediction models 218 has been described later in reference to FIG. 4A and FIG. 4B. The same is not explained here for the sake of brevity.

In an embodiment, the clearing score computation module 228 includes suitable logic and/or interfaces for generating, by one or more clearing prediction models 218, a clearing score for the ongoing payment transaction based, at least in part, on the transaction feature set and the historical trend feature set. More specifically, the clearing score computation module 228 is configured to determine, by at least one model (called, a first ML model) from the one or more clearing prediction models 218, a transaction clearance likelihood score based, at least in part, on the transaction feature set and the historical trend feature set. In particular, the first ML model utilizes a historical authentication feature subset from the historical trend feature set along with the transaction feature set to compute the transaction clearance likelihood score. Herein, the historical authentication feature subset includes features related to historically authenticated transactions that were successfully cleared by different acquirers. In a non-limiting example, the historical authentication feature set may include, but is not limited to, metrics related to bridging transaction associated with cardholders 104, merchants 106, issuers server 108, and acquirers server 110; an approval rate, a decline rate, a clearing rate associated with cardholders 104, merchants 106, issuers server 108, and acquirers server 110; and an approval rate, a decline rate, a clearing rate for bridging transactions associated with cardholders, merchants, issuers, and acquirers. It is understood that the term 'metric' may refer to percentage values, overall values, average values, aggregate values and so on depending on the use case or relevance of the feature being considered.

Further, the clearing score computation module 228 is configured to determine, by at least another model (called, a second ML model) from the one or more clearing prediction models 218, a transaction dispute likelihood score based, at least in part, on the transaction feature set and the historical trend feature set. In particular, the second ML model utilizes a historical dispute feature subset from the historical trend feature set along with the transaction feature set to compute the transaction dispute likelihood score. Herein, the historical dispute feature subset includes features related to historically disputed transactions that were not cleared by different acquirer server 110. Thereafter, the clearing score computation module 228 is configured to compute the clearing score based, at least in part, on the transaction clearance likelihood score and the transaction dispute likelihood score. In particular, an overall likelihood for transaction clearance is determined based on analyzing the individual scores.

In a non-limiting example, the historical dispute feature set may include but is not limited to, metrics related to a dispute rate, a chargeback rate, a representment rate, case phase disputes percentage associated with cardholders 104, merchants 106, issuers server 108, and acquirers server 110; and a dispute rate, a chargeback rate, a representment rate, case phase disputes percentage for bridging transactions associated with cardholders 104, merchants 106, issuers server 108, and acquirers server 110.

In an embodiment, the clearing score computation module 228 may compare the predicted transaction clearance likelihood score with the first threshold value. In some instances, the transaction clearance likelihood score may be represented as a percentage between 0% to 100% or simply, a value between 0 to 100. In a non-limiting example, the transaction clearance likelihood score may be a number between 0 and 1 when normalized. Now, upon comparing with the first threshold value, the clearing score computation module 228 may determine whether the ongoing payment transaction will or will not clear. For instance, if the first threshold value is 0.9 and the transaction clearance likelihood score is 0.8, then the clearing score computation module 228 can determine that the transaction will not clear. In an alternative instance, if the first threshold value is 0.9 and the transaction clearance likelihood score is 0.98, then the clearing score computation module 228 can determine that the transaction will clear.

In another embodiment, the clearing score computation module 228 may compare the predicted transaction dispute likelihood score with the second threshold value. In some instances, the transaction dispute likelihood score may be represented as a percentage between 0% to 100% or simply, a value between 0 to 100. In a non-limiting example, the transaction dispute likelihood score may be a number between 0 and 1 when normalized. Now, upon comparing with the second threshold value, the clearing score computation module 228 may determine whether the ongoing payment transaction will or will not be disputed. For instance, if the second threshold value is 0.9 and the transaction dispute likelihood score is 0.6, then the clearing score computation module 228 can determine that the transaction will not be disputed. In an alternative instance, if the second threshold value is 0.8 and the transaction dispute likelihood score is 0.9, then the clearing score computation module 228 can determine that the transaction will be disputed.

Further, as described earlier, the clearing score computation module 228 computes the clearing score based on the transaction clearance likelihood score and the transaction dispute likelihood score. In other words, the clearing score computation module 228 is responsible for weighing the impact of both the likelihood of a future chance of clearing and a future chance of a dispute while generating the overall clearing score for the ongoing payment transaction. In some instances, the clearing score computation module 228 may also assign a delay time to the issuer for delaying the ongoing payment transaction based on the clearing score. The delay time value may be added to a hold transaction message. The delay time value may indicate to the issuer to delay the settlement for the ongoing payment transaction for the specified delay time. Upon completion of the delay time, the issuer may be configured to automatically execute the settlement process. In an example, the assignment of delay time may be performed based at least in part on a set of rules or policies.

In another embodiment, the clearing score computation module 228 is communicably coupled to the notification module 230 and is configured to transmit the clearing score to the notification module 230.

In an embodiment, the notification module 230 includes suitable logic and/or interfaces for generating and transmitting a hold transaction message to the issuer server 108 based, at least in part, on the clearing score being lower than a predefined threshold. In an alternative embodiment, the notification module 230 is configured to generate and transmit a settlement initiation message to the issuer server 108 based, at least in part, on the clearing score being at least equal to the predefined threshold.

In another embodiment, the notification module 230 is configured to receive a transaction clearing message for the ongoing payment transaction from the acquirer server such as acquirer server 110(1). Then, in response to receiving the transaction clearing message, the notification module 230 is configured to transmit a settlement initiation message to the issuer server 108. In some instances, the various messages exchange between the acquirer server 110(1), the server system 200, and the issuer server 108(1) may be Application Programming Interface (API) or extended markup language (XML) messages.

Figure 3A:
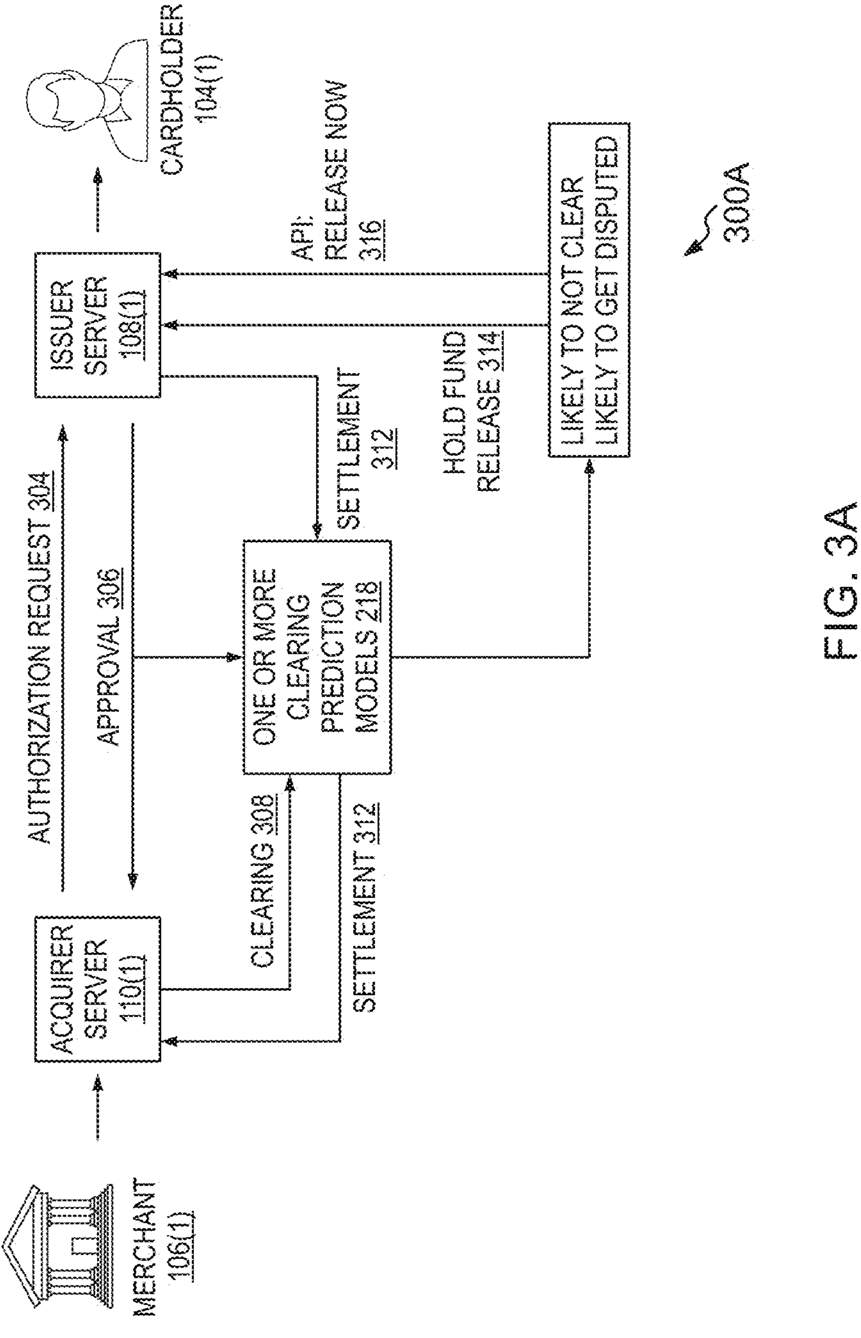
FIG. 3A illustrates a block diagram representation depicting a process flow for intelligently halting or delaying the settlement process for an ongoing payment transaction, in accordance with an embodiment of the present disclosure.

FIG. 3A illustrates a block diagram representation 300A depicting a process flow for intelligently halting or delaying the settlement process for an ongoing payment transaction, in accordance with an embodiment of the present disclosure.

In a scenario, the cardholder such as cardholder 104(1) may perform a payment transaction (referred to as the ongoing payment transaction in the present scenario) with the merchant 106(1) to purchase or avail goods, products, or services by the merchant 106(1). For example, the merchant 106(1) may be a grocery merchant and the cardholder 104(1) may perform the payment transaction to buy groceries. In another example, the merchant 106(1) may be an e-commerce merchant and the cardholder 104(1) may perform the payment transaction to avail of an online service (such as a music subscription) from the merchant 106(1). To perform such a payment transaction, the cardholder 104(1) provides his/her payment card details or information to the merchant 106(1) using a POS device or payment gateway. For instance, the payment card details may include a PAN, a card expiration date, a cardholder name, a Card Verification Value (CVV), a One Time Password (OTP), or any other Two-factor authentication (2FA) key or so on. The merchant 106(1) is configured to transmit this payment card information to their corresponding acquiring bank through the acquirer server 110(1). In the present scenario, it is assumed that the acquirer server 110(1) is operating using the dual message system or standard. Upon receiving this payment card information, the acquirer server 110(1) is configured to transmit an authentication request message (see, 304) to the issuer server 108(1) of the issuing bank of the cardholder 104(1). In the present scenario, it is assumed that the issuer server 108(1) is operating using the single message system or standard. The issuer server 108(1) may then authenticate the identity of the cardholder using a variety of authenticating techniques. Such authenticating techniques are well known in the art; therefore they are not explained here for the sake of brevity. Upon unsuccessful authentication, the payment process is terminated. On the other hand, if the cardholder 104(1) is authenticated successfully, the issuer server 108 transmits the payment authorization message (see, 306) to the acquirer via the server system 200.

When the server system 200 receives the payment authorization message, the server system 200 utilizes one or more clearing prediction models 218 associated with it to compute the clearing score 302 for the ongoing payment transaction. As described earlier, the clearing score indicates the likelihood of the ongoing payment transaction being either delayed or fail (due to not clearing (see, 308) by the acquirer server 110). The process for computing the clearing score 302 has been described in further detail with reference to FIG. 3B.

The clearing score 302 is utilized by the server system 200 to determine whether to hold the settlement process for the ongoing payment transaction or let it proceed as it is. For instance, if the clearing score is lower than the predefined threshold (e.g. the first threshold), a hold transaction message (see, hold fund release 314) may be generated and transmitted to the issuer server 108. In some instances, the hold transaction message may be shared using an API message or an XML message.

As would be apparent, since the issuer server 108(1) is operating using the single message system, upon successful authentication, conventionally it would initiate the payment settlement process (see, 312). However, upon receiving the hold transaction message the issuer server 108(1) can put the settlement process for the ongoing payment transaction on hold, until further instructions are received from the server system 200.

In an alternative instance, if the clearing score is at least equal to the predefined threshold, a settlement initiation message may be generated and transmitted to the issuer server 108 (such as issuer server 108(1)). In some instances, the settlement initiation message may be shared using an API message (e.g. API: release now 316) or an XML message. As would be apparent, upon receiving the settlement initiation message the issuer server 108 can proceed with the settlement process without any delay or further instructions from the server system 200. The server system 200 may use the notification module 230 to notify the issuer server 108 with either the hold transaction message or the settlement initiation message.

Further, since the acquirer server 110 (such as acquirer server 110(1)) is operating using the double (dual) message system, it waits and confirms whether the purchase can be fulfilled before sending a transaction clearing message to the server system 200. Once the transaction clearing message is received the server system 200 can transmit the settlement initiation message to the issuer server 108(1). Thus, the server system 200 can halt or delay the settlement process (see, 312) for the ongoing payment transactions based on intelligent insights regarding the ongoing payment transaction.

Figure 3B:
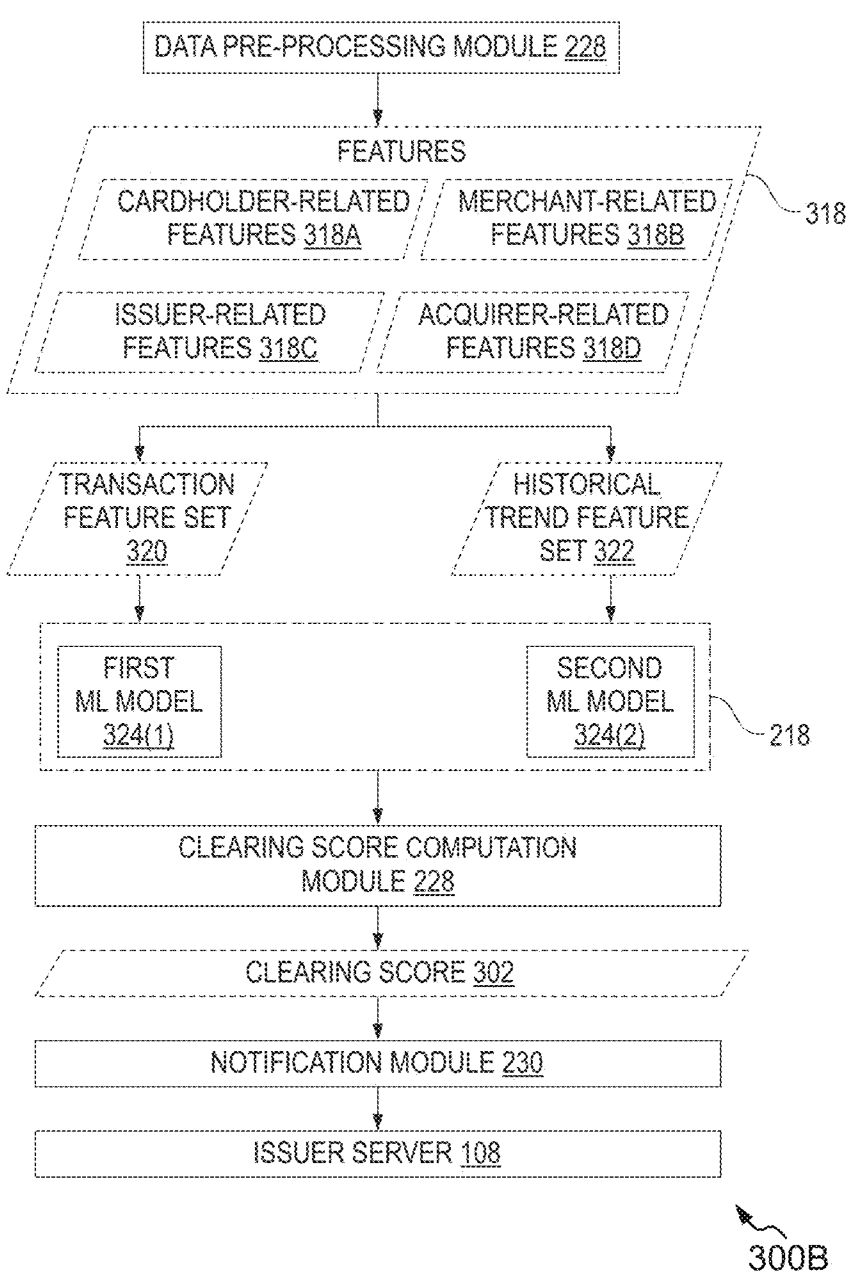
FIG. 3B illustrates a block diagram representation depicting a process flow for generating a clearing score, in accordance with an embodiment of the present disclosure.

FIG. 3B illustrates a block diagram representation 300B depicting a process flow for generating a clearing score (e.g., a clearing score 302), in accordance with an embodiment of the present disclosure.

Upon receipt of the payment authorization message, the server system 200 is configured to utilize the data preprocessing module 224 to generate a plurality of features (see, features 318) based on both the information associated with the ongoing payment transaction and the plurality of historical transactions. The plurality of features 318 may include features related to each entity in the four-party framework, i.e., the cardholder, the merchant, the issuer and the acquirer. In other words, the plurality of features 318 may include cardholder-related features 318A, merchant-related features 318B, issuer-related features 318C, and acquirer-related features 318D. Further, these features 318 may be segregated into the transaction feature set 320 and the historical trend feature set 322. Each of these different types of feature sets can be used by AI/ML models to generate the clearing score 302. To generate the clearing score 302, the server system 200 is configured to first determine the likelihood for the clearance of the ongoing payment transactions and then, determine the likelihood for the ongoing payment transaction to face any dispute in the near future leading to no transaction clearance message from the acquirer server 110(1).

To achieve this, the server system 200 is configured to compute a transaction clearance likelihood score indicating the probability of the transaction being cleared in the near future. In particular, the server system 200 is configured to utilize at least one model (called, the first ML model 324(1)) from the one or more clearing prediction models 218. More specifically, the at least one model is configured to compute the transaction clearance likelihood score based, at least in part, on the transaction feature set 320 and the historical trend feature set 322.

Similarly, server system 200 is configured to compute a transaction dispute likelihood score indicating the probability of the transaction being disputed by the cardholder 104 (such as cardholder 104(1)) in the near future. In particular, the server system 200 is configured to utilize at least another model (called, the second ML model 324(2)) from the one or more clearing prediction models 218. More specifically, at least another model is configured to compute the transaction dispute likelihood score based, at least in part, on the transaction feature set 320 and the historical trend feature set 322.

Then, the server system 200 is configured to compute the clearing score (i.e., the overall likelihood of the transaction being cleared) based at least on the transaction clearance likelihood score and the transaction dispute likelihood score. Based on the clearing score, the server system 200 decides whether the settlement process associated with the ongoing payment transaction should be allowed as it is or put on hold. For instance, if the clearing score is high, then the settlement process associated with the ongoing payment transaction should be allowed to proceed. On the other hand, for an instance, if the clearing score is low, then the settlement process associated with the ongoing payment transaction should either be kept on hold until the transaction clearing message is received from the acquirer server 110 or halt the transaction from the settlement. Once, the clearing score 302 is determined, the server system 200 is configured to utilize the notification module 230 to generate and transmit either the settlement initiation message or the hold transaction message to the issuer server 108.

Figure 4A:
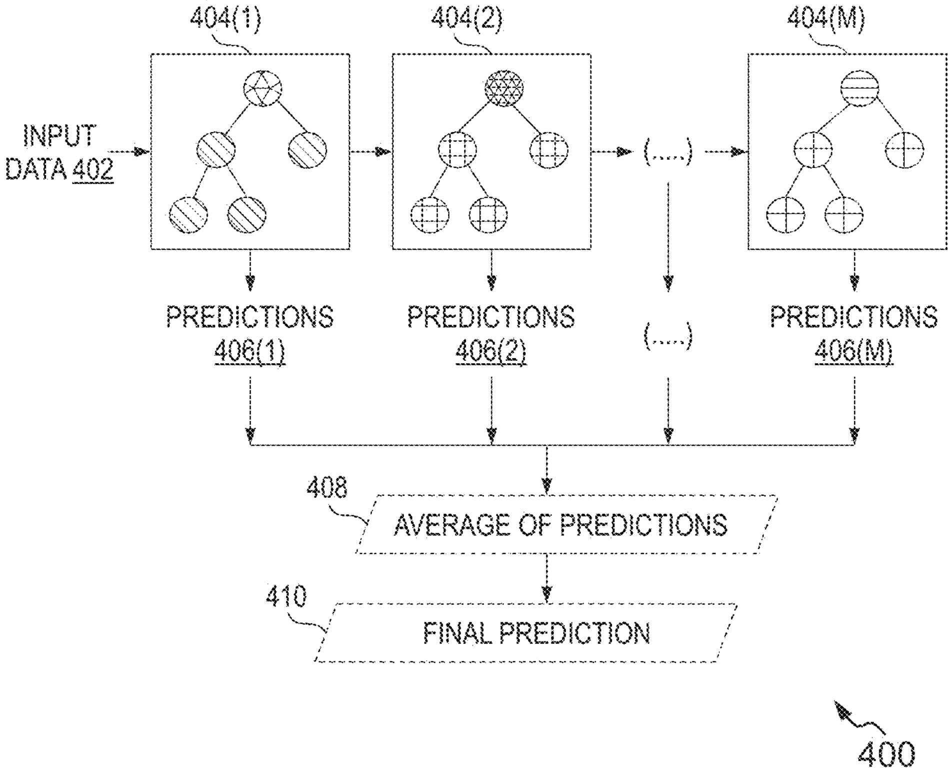
FIG. 4A illustrates a schematic representation of a process of training one or more clearance prediction models for generating the confidence score, in accordance with an embodiment of the present disclosure.

FIG. 4A illustrates a schematic representation 400 of a process of training of the one or more clearaning prediction models (e.g., the one or more clearance prediction models 120) for generating the confidence score (e.g., the clearing score 302), in accordance with an embodiment of the present disclosure. In a non-limiting example, the one or more clearaning prediction models 120 may include one model (called hereinafter interchangeably as "first ML model" for simplicity) and another model (called hereinafter interchangeably as "second ML model" for simplicity). Further, it is noted that for the sake of explanation, although, the one or more clearance prediction models are considered to be eXtreme Gradient Boosting (XGBoost), the same should not be construed as a limitation. To that end, one or more clearance prediction models can be any decision tree based ML models.

Herein each of the first ML model 324(1) and the second ML model 324(2) may be trained and generated separately and independently for separate purposes as mentioned earlier in the present disclosure, and then based on outputs obtained from each of the first ML model 324(1), and the second ML model 324(2), the clearing score 302 may be generated. However, for the sake of simplicity, only the generic training methodology of the tree based ML model is described here.

Moreover, as may be understood that, in an embodiment, each of the one or more clearance prediction models 120 may be a Gradient Boosting Machine (GBM) model or an extreme gradient boosting (XGBoost) model, training steps of each of the one or more clearance prediction models 120 and the features provided to each of the one or more clearance prediction models 120 may be same or different without any limitation.

As used herein, the term "Gradient Boosting" refers to a popular boosting algorithm in machine learning used for classification and regression tasks. It may be noted that boosting is one kind of ensemble learning method that trains the model sequentially and each new model tries to correct the previous model. It combines several weak learners into strong learners. Similarly, as used herein, the term "extreme gradient boosting" refers to a type of boosting algorithm in machine learning which is similar to the GBM model, however, the difference is in model details, for example, the XGBoost model in comparison to the GBM model is more regularized model formalization to control a problem of over-fitting, which gives a better performance.

As may be understood, the XGBoost model is a scalable tree boosting system that can solve real-world problems with remarkable performance using minimal resources. Herein, the XGBoost model receives an input data 402. In an embodiment, the input data 402 may be similar to the historical transaction dataset 220 along with the feature sets extracted from the ongoing payment transaction. In an embodiment, the input data 402 may be split into training data and testing data, whereby the training data may be used while training the XGBoost model and the testing data may be used while testing whether the XGBoost model is functioning as per its purpose of training or not.

Further, the XGBoost model produces individual decision trees (e.g., decision trees 404(1), 404(2), . . . 404(M) where 'M' is a non-zero Natural number, hereinafter, interchangeably referred to as decision trees 404 sequentially, where a subset of the training data for each subsequent tree (e.g., the decision tree 404(2) is chosen based on the performance of the previous decision trees (e.g., the decision tree 404(1)), as shown in FIG. 4A. More specifically, each decision tree is trained on the examples that were incorrectly classified by the previous classifiers.

It may be noted that the XGBoost model uses a second-order gradient boosting technique based on the gradient descent algorithm which aims to minimize the loss when adding new models or decision trees. Therefore, each new decision tree corrects the errors made by the previous trees. This will finally produce 'M' decision trees, where 'M' depends on the number of predetermined iterations for the algorithm, which provide 'M' predictions 406(1), 406(2), . . . , 406(M) where 'M' is a non-zero natural number, hereinafter, interchangeably referred to as predictions 406).

Further, the final classification is made by combining the outputs (e.g., the predictions 406) of all the classifiers (decision trees) with the chosen weighting and averaging method. In other words, it may be noted that an average of the predictions 406 (see, 408) may be performed by the XGBoost model for obtaining a final prediction 410 as shown in FIG. 4A. It is understood that the process of FIG. 4A may be performed to train any model from the one or more clearing prediction models 218.

Figure 4B:
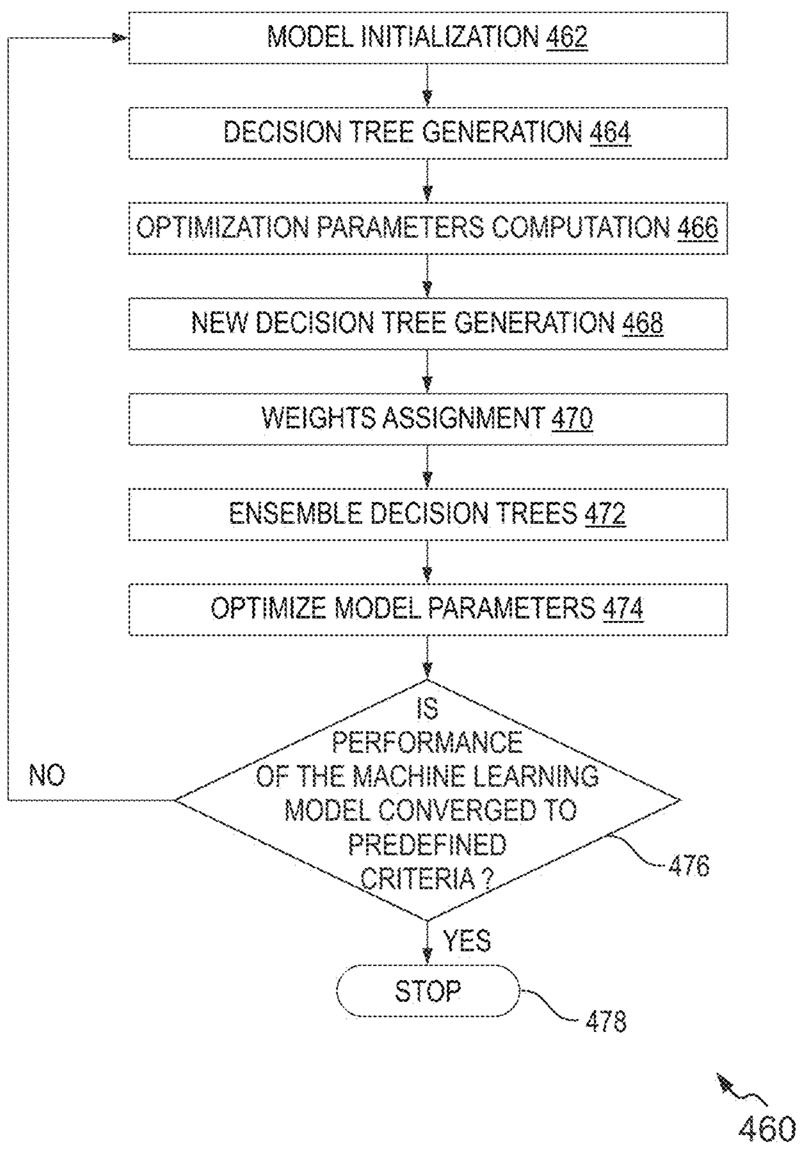
FIG. 4B illustrates a flow diagram representation of a process flow of training one or more clearance prediction models, in accordance with an embodiment of the present disclosure.

FIG. 4B illustrates a flow diagram representation 460 of a process flow of training the one or more clearance prediction models 120, in accordance with an embodiment of the present disclosure. In a non-limiting example, the one or more clearance prediction models 120 may include the first ML model 324(1) and the second ML model 324(2). In another example, the one or more clearance prediction models 120 may include any number of ML models without limiting the scope of the present disclosure. Herein, in an embodiment, each model of the one or more clearance prediction models 120 may be trained via the training module 226 by performing a set of operations iteratively till the performance of the said model converges to predefined criteria. In a non-limiting example, each model of the one or more clearance prediction models 120 may be an XGBoost model whose basic functionality has already been explained earlier with reference to FIG. 4A.

In an embodiment, the set of operations may include model initialization 462, decision tree generation 464, optimization parameters computation 466, new decision tree generation 468, weights assignment 470, ensemble decision trees 472, optimizing model parameters (see optimize model parameters 474), and check whether the performance of the ML model (e.g., each of the one or more clearance prediction models 120) converged to the predefined criteria (see, 476). In case the ML model converges to the predefined criteria, the training of the ML model stops (see, 478), otherwise, the set of operations in the training of the ML model would be repeated as shown in FIG. 4B.

Since, the XGBoost model is a supervised learning model, the model may use the training data with the plurality of features say '$x_i$' that are independent variables to predict a target variable say '$\hat{y}_i$' that may be labeled for classification task or numerical values for regression task.

In an embodiment, basic elements of supervised learning may include a mathematical model and parameters associated with the mathematical model and objective function which is a combination of a training loss and regularization. Examples of mathematical models include exponential decay, exponential growth, quadratic function, and linear function. In a non-limiting example, when a linear model may be considered, the prediction may be given by the following equation:

$$\hat{y}_i = \sum_j \theta_j x_{ij} \qquad \text{Eqn. 1}$$

Herein, the Eqn. 1 may correspond to a linear combination of weighted input features ($x_{ij}$) and '$\theta_j$' may refer to a coefficient/parameter that is used as weights multiplied with the input features. Further, it may be noted that the task of training the model amounts to finding the best parameters '$\theta$' that best fit the training data and labels. To train the model, the objective function may have to be defined to measure how well the model fits the training data.

A salient characteristic of the objective function is that it consists of two parts: training loss and regularization term and is represented by the following equation:

$$obj(\theta) = L(\theta) + \Omega(\theta) \qquad \text{Eqn. 2}$$

Herein, 'L' is the loss function, and '$\Omega$' is the regularization term. In some embodiments, the loss function may include mean squared loss, logistic loss, or the like. The regularization term controls the complexity of the model, which helps avoid overfitting.

In another embodiment, other parameters may include hyperparameters such as, but not limited to, a number of boosting rounds, a learning rate, a maximum tree depth, and the like. In some embodiments, the regularization terms may be two in number. It is important to carefully tune these parameters for better model performance.

In an embodiment, the step of model initialization 462 may include initializing an ML model (e.g., the first ML model or the second ML model) of the one or more clearance prediction models 120 based, at least in part, on one or more model parameters and an initial prediction. In a non-limiting example, the one or more model parameters may include the parameters and the hyperparameters such as initial weights, number of trees, layer and so on. Herein, the initial prediction may include a simple prediction such as a means of the target values for regression tasks, or the most frequent class for classification tasks.

In another embodiment, the step of decision tree generation 464 may include a step of generating a set of classification and regression trees. In this step, based on the training data a decision tree may be generated. In other words, it may be noted that this step includes generating a decision tree for generating predictions 406 (as shown in FIG. 4A) based, at least in part, on the historical trend feature set 322 and the transaction feature set 320. Herein, the feature set being selected for training may be dependent upon whether the ML model being trained is the first ML model or the second ML model.

Later, the step of optimization parameters computation 466 may be implemented. Herein, the ML model may compute one or more optimization parameters based at least on the performance of the decision tree, using one or more optimization functions. In a non-limiting example, the one or more optimization parameters may include a loss function, a gradient (first derivative) of the loss function, a hessian (second derivative) of the loss function, and the like. Herein, it may be noted that each of the one or more parameters may be computed using their respective optimization functions. More specifically, it may be noted that the gradient indicates how much the predictions need to be updated to reduce the overall loss. Similarly, hessian is used to adjust the step size (learning rate) during the optimization process.

Further, in an embodiment, the step of new decision tree generation 468 may include building a new decision tree for reducing the one or more optimization parameters. Herein, it may be noted that the new decision tree may reduce the one or more optimization parameters by capturing patterns and relationships that were not well-modeled by the previous trees.

In an embodiment, the step of weights assignment 470 may include assigning weights to the new decision tree and the previously generated decision tree based, at least in part, on a performance of the new decision tree and the previously generated decision tree in reducing the one or more optimization parameters. For example, decision trees that contribute more to the model's predictive performance receive higher weights.

Later, in an embodiment, the step of ensemble decision trees 472 may be performed which includes generating an ensemble of a plurality of decision trees (such as decision trees 404, as shown in FIG. 4A) by adding predictions (e.g., prediction 406(2) of the new decision tree to predictions (e.g., prediction 406(1) of the previously generated decision tree. Lastly, the step of optimize model parameters (see, optimize model parameters 474) may be performed which includes optimizing the one or more model parameters for the corresponding ML model of the one or more clearance prediction models 120.

Upon obtaining the ensemble of the decision trees 404 and optimizing the one or more model parameters, the performance of the ML model is checked for its convergence to the predefined criteria. If the performance of the ML model converges to the predefined criteria, the training process stops (see, 478), otherwise, the process repeats, until the corresponding convergence is achieved.

In some embodiments, the predefined criteria for the convergence of the ML model may be dependent on one or more factors such as a number of iterations or trees, a minimum improvement in loss, validation set performance, and early stopping criteria. Herein, in an embodiment, the factor of the number of iterations or trees may refer to a criterion in which a maximum number of iterations is fixed for the training process and once the model reaches that number, the training process stops. In another embodiment, the factor of the minimum improvement in loss may refer to a criterion in which a minimum improvement in the loss function in consecutive iterations is observed and if the improvement falls below a predefined threshold the training process stops.

In yet another embodiment, the factor of validation set performance may refer to monitoring the performance of the model on a validation set at each iteration and if the performance of the model on the validation set does not improve or starts to degrade, then the training process stops. Further, in an embodiment, the factor of early stopping criteria may refer to a criterion that may be chosen to prevent overfitting. It involves dividing the training data into training and validation sets. The training process continues until the performance on the validation set stops improving, and then the model with the best performance on the validation set is selected as the final model.

Further, it may be noted that in an embodiment, the server system 200 may generate or learn the first ML model 324(1) via the training module 226. The training module 226 may perform a first set of operations to generate the first ML model 324(1). Upon performing the first set of operations, the first ML model 324(1) may get trained using the historical transaction dataset 220 and learn to generate a likelihood score for a transaction to be cleared, i.e., the transaction clearance likelihood score. Herein, the first ML model 324(1) may be based on the first set of features. For instance, the historical authentication feature set may be used to train the first ML model 324(1).

Similarly, the second ML model 324(2) may get trained using the historical transaction dataset 220 and learn to generate a likelihood score for a transaction to be disputed, i.e., the transaction dispute likelihood score. Herein, the second ML model 324(2) may be based on the different features than those used by the first ML model 324(1). For instance, the historical dispute feature set may be used to train the second ML model 324(2).

Moreover, it may be noted that the set of operations performed for training each of the first ML model 324(1) and the second ML 324(2) model may be the same as described above with reference to the step of model initialization 462 to the step of checking the performance of the model (see, 476) with the difference being the set of features on which the training process is implemented for each model. The first ML model 324(1) may take the transaction feature set and historical authentication feature set as input with target labels as whether transaction will clear or not. Further, the second ML model 324(2) may take the transaction feature set and historical dispute feature set as input with target labels as whether transaction will get disputed or not.

Figure 5:
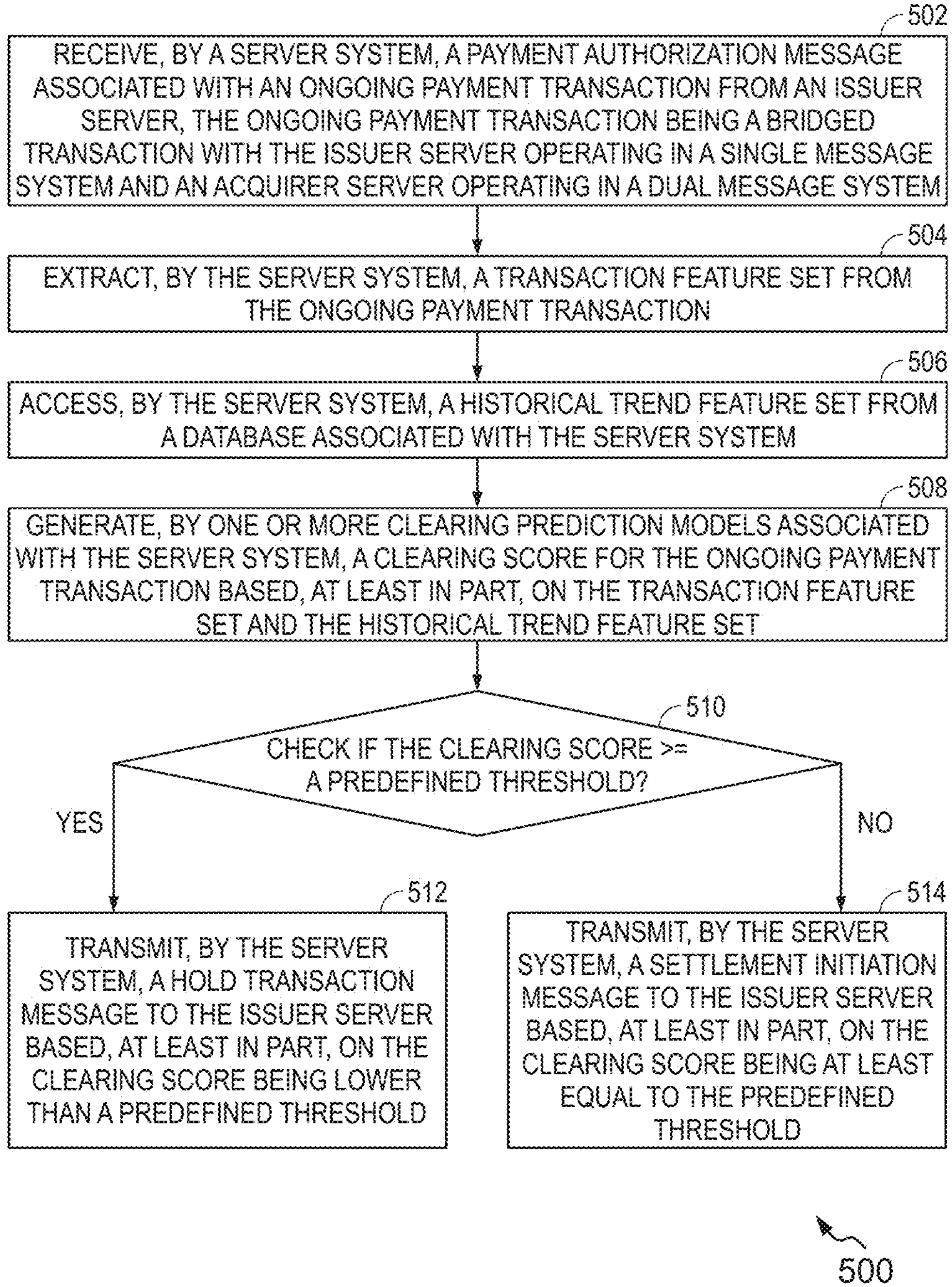
FIG. 5 illustrates a process flow diagram depicting a method for processing payment in a bridged transaction message system, in accordance with an embodiment of the present disclosure.

FIG. 5 illustrates a process flow diagram depicting a method 500 for processing payment in a bridged transaction message system, in accordance with an embodiment of the present disclosure. The method 500 depicted in the flow diagram may be executed by, for example, the server system 200. The sequence of operations of the method 500 may not be necessarily executed in the same order as they are presented. Further, one or more operations may be grouped and performed in the form of a single step, or one operation may have several sub-steps that may be performed in parallel or in a sequential manner. Operations of the method 500, and combinations of operations in the method 500 may be implemented by, for example, hardware, firmware, a processor, circuitry, and/or a different device associated with the execution of software that includes one or more computer program instructions. The plurality of operations is depicted in the process flow of the method 500. The process flow starts at operation 502.

At 502, the method 500 includes receiving, by a server system 200 (e.g., the server system 200) a payment authorization message associated with an ongoing payment transaction from an issuer server such as issuer server 108. The ongoing payment transaction is a bridged transaction with the issuer server 108 operating in a single message system and an acquirer server 110 operating in a dual message system.

At 504, the method 500 includes extracting, by the server system 200, a transaction feature set 320 from the ongoing payment transaction.

At 506, the method 500 includes accessing, by the server system 200, a historical trend feature set from a database associated with the server system.

At 508, the method 500 includes generating, by one or more clearing prediction models 218 associated with the server system 200, a clearing score for the ongoing payment transaction based, at least in part, on the transaction feature set 320 and the historical trend feature set 322.

At 510, the method 500 includes checking if the clearing score is at least equal to a predefined threshold. If so, the process flow proceeds to operation 512, otherwise operation 514 is performed.

At 512, the method 500 includes transmitting, by the server system 200, a hold transaction message to the issuer server 108 based, at least in part, on the clearing score being lower than a predefined threshold. In one embodiment, if the one or more clearing prediction models 218 predict that the transaction is likely not to be cleared by comparing the clearing score with the predefined threshold, then the hold transaction message is shared with the issuer server 108. In particular, upon receiving this message, the issuer server 108 is configured to hold the funds in the payment account of the cardholder 104 until the transaction clearing message is received from the acquirer 110.

At 514, the method 500 includes transmitting, by the server system 200, a settlement initiation message to the issuer server 108 based, at least in part, on the clearing score being at least equal to the predefined threshold. In an alternative example, if one or more clearing prediction models 218 predict that the transaction is likely to be cleared by comparing the clearing score with the predefined threshold, then the settlement initiation message (such as API: Release Now 316) is shared with the issuer server 108. In particular, upon receiving this message, the issuer server 108 is configured to release the funds to perform the settlement operation and transfer the funds to either the payment gateway associated with the server system 200 or an organization operating the server system 200.

Figure 6:
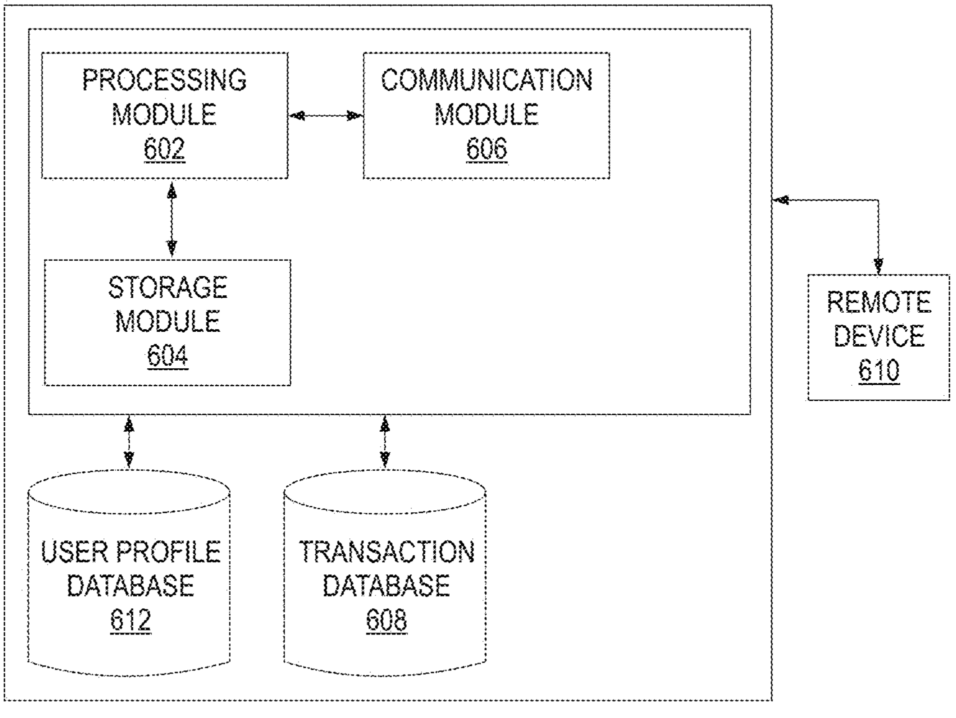
FIG. 6 illustrates a simplified block diagram of an acquirer server, in accordance with an embodiment of the present disclosure.

FIG. 6 illustrates a simplified block diagram of an acquirer server 600, in accordance with an embodiment of the present disclosure. The acquirer server 600 is an example of the acquirer servers 110 of FIG. 1. The acquirer server 600 is associated with an acquirer bank/acquirer, in which a merchant 106 may have an account, which provides a payment card. The acquirer server 600 includes a processing module 602 operatively coupled to a storage module 604 and a communication module 606. The components of the acquirer server 600 provided herein may not be exhaustive, and the acquirer server 600 may include more or fewer components than those depicted in FIG. 6. Further, two or more components may be embodied in one single component, and/or one component may be configured using multiple sub-components to achieve the desired functionalities. Some components of the acquirer server 600 may be configured using hardware elements, software elements, firmware elements, and/or a combination thereof.

The storage module 604 is configured to store machine-executable instructions to be accessed by the processing module 602. Additionally, the storage module 604 stores information related to, the contact information of the merchant 106, bank account number, availability of funds in the account, payment card details, transaction details, and/or the like. Further, the storage module 604 is configured to store transactions associated with the merchant 106.

In one embodiment, the acquirer server 600 is configured to store profile data (e.g., an account balance, a credit line, details of the cardholders 104, account identification information, and a payment card number) in a transaction database 608. The details of the cardholders 104 may include, but are not limited to, name, age, gender, physical attributes, location, registered contact number, family information, alternate contact number, registered e-mail address, etc.

The processing module 602 is configured to communicate with one or more remote devices such as a remote device 610 using the communication module 606 over a network such as the network 118 of FIG. 1. The examples of the remote device 610 include the server system 102, the payment server 114, the issuer servers 108, or other computing systems of the acquirer server 600, and the like. The communication module 606 can facilitate such operative communication with the remote devices and cloud servers using Application Program Interface (API) calls. The communication module 606 is configured to receive a payment transaction request performed by the cardholders 104 via the network 118. The processing module 602 receives payment card information, a payment transaction amount, cardholder information, and merchant information from the remote device 610 (i.e., the payment server 114). The acquirer server 600 includes a user profile database 612 and the transaction database 608 for storing transaction data. The user profile database 612 may include information about the cardholders 104. The transaction data may include, but is not limited to, transaction attributes, such as transaction amount, source of funds such as bank or credit cards, transaction channel used for loading funds such as POS terminal or ATM, transaction velocity features such as count and transaction amount sent in the past x days to a particular user, transaction location information, external data sources, preauth transactions, failed transactions, disputed transactions, non-cleared transactions and other internal data to evaluate each transaction.

Figure 7:
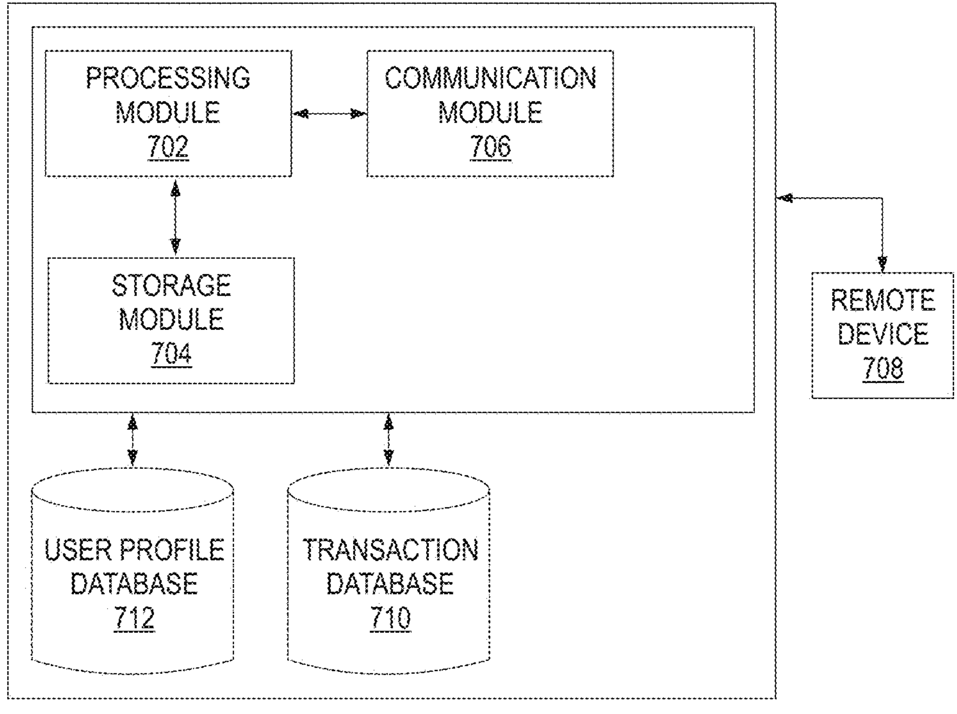
FIG. 7 illustrates a simplified block diagram of an issuer server, in accordance with an embodiment of the present disclosure.

FIG. 7 illustrates a simplified block diagram of an issuer server 700, in accordance with an embodiment of the present disclosure. The issuer server 700 is an example of the issuer servers 108 of FIG. 1. The issuer server 700 is associated with an issuer bank/issuer, in which an account holder (e.g., the cardholders 104(1)-104(N)) may have an account, which provides a payment card. The issuer server 700 includes a processing module 702 operatively coupled to a storage module 704 and a communication module 706. The components of the issuer server 700 provided herein may not be exhaustive and the issuer server 700 may include more or fewer components than those depicted in FIG. 7. Further, two or more components may be embodied in one single component, and/or one component may be configured using multiple sub-components to achieve the desired functionalities. Some components of the issuer server 700 may be configured using hardware elements, software elements, firmware elements, and/or a combination thereof.

The storage module 704 is configured to store machine-executable instructions to be accessed by the processing module 702. Additionally, the storage module 704 stores information related to, the contact information of the cardholders (e.g., the cardholders 104(1)-104(N)), a bank account number, availability of funds in the account, payment card details, transaction details, payment account details, and/or the like. Further, the storage module 704 is configured to store transactions associated with the cardholders 104.

In one embodiment, the issuer server 700 is configured to store profile data (e.g., an account balance, a credit line, details of the cardholders 104, account identification information, payment card number, etc.) in a database. The details of the cardholders 104 may include but are not limited to, name, age, gender, physical attributes, location, registered contact number, family information, alternate contact number, registered e-mail address, or the like of the cardholders 104.

The processing module 702 is configured to communicate with one or more remote devices such as a remote device 708 using the communication module 706 over a network such as the network 118 of FIG. 1. Examples of the remote device 708 include the server system 200, the payment server 114, the acquirer servers 110 or other computing systems of the issuer server 700. The communication module 706 can facilitate such operative communication with the remote devices 708 and cloud servers using Application Program Interface (API) calls. The communication module 706 is configured to receive a payment transaction request performed by an account holder (e.g., the cardholder 104(1)) via the network 118. The processing module 702 receives payment card information, a payment transaction amount, customer (or cardholder) information, and merchant information from the remote device 708 (e.g., the payment server 114). The issuer server 700 includes a transaction database 710 for storing transaction data. The transaction data may include, but is not limited to, transaction attributes, such as transaction amount, source of funds such as bank or credit cards, transaction channel used for loading funds such as POS terminal or ATM, preauthorization transactions, transaction velocity features such as count and transaction amount sent in the past x days to a particular account holder, transaction location information, external data sources, and other internal data to evaluate each transaction. The issuer server 700 includes a user profile database 712 storing user profiles associated with the plurality of account holders.

The user profile data may include an account balance, a credit line, details of the account holders, account identification information, payment card number, or the like. The details of the account holders (e.g., the cardholders (104(1)-104(N)) may include, but are not limited to, name, age, gender, physical attributes, location, registered contact number, family information, alternate contact number, registered e-mail address, or the like of the cardholders 104.

Figure 8:
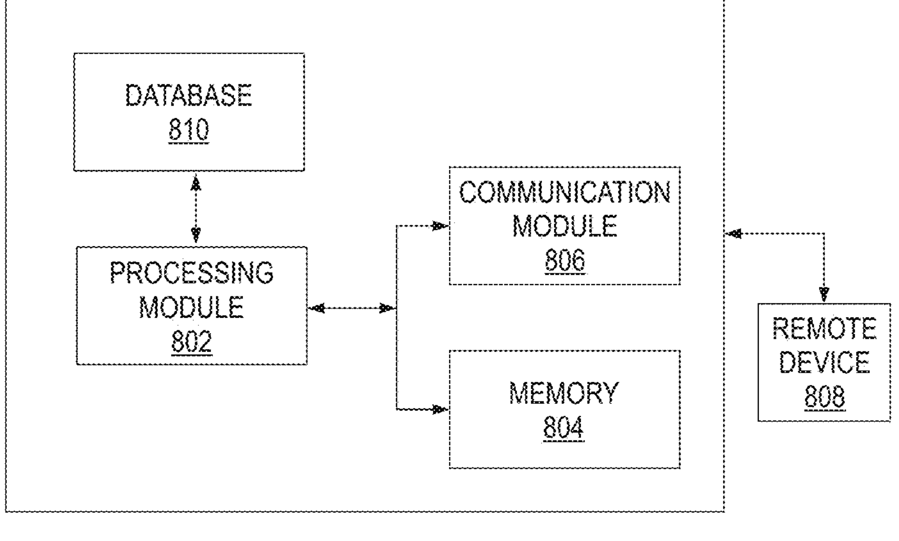
FIG. 8 illustrates a simplified block diagram of a payment server, in accordance with an embodiment of the present disclosure.

FIG. 8 illustrates a simplified block diagram of the payment server 800, in accordance with an embodiment of the present disclosure. The payment server 800 is an example of the payment server 114 of FIG. 1. The payment server 800 and the server system 200 may use the payment network 112 as a payment interchange network. Examples of payment interchange networks include, but are not limited to, Mastercard® payment system interchange network.

The payment server 800 includes a processing module 802 configured to extract programming instructions from a memory 804 to provide various features of the present disclosure. The components of the payment server 800 provided herein may not be exhaustive, and the payment server 800 may include more or fewer components than that depicted in FIG. 8. Further, two or more components may be embodied in one single component, and/or one component may be configured using multiple sub-components to achieve the desired functionalities. Some components of the payment server 800 may be configured using hardware elements, software elements, firmware elements, and/or a combination thereof.

Via a communication module 806, the processing module 802 receives a request from a remote device 808, such as the issuer servers 108, the acquirer servers 110, or the server system 102. The request may be a request for conducting the payment transaction. The communication may be achieved through API calls, without loss of generality. The payment server 800 includes a database 810. The database 810 also includes transaction processing data such as issuer ID, country code, acquirer ID, and merchant identifier (MID), among others.

When the payment server 800 receives a payment transaction request from the acquirer servers 110 or a payment terminal (e.g., IoT device), the payment server 800 may route the payment transaction request to the issuer servers 108. The database 810 stores transaction identifiers for identifying transaction details such as transaction amount, IoT device details, acquirer account information, transaction records, merchant account information, and the like.

In one example embodiment, the acquirer servers 110 are configured to send an authorization request message to the payment server 800. The authorization request message includes, but is not limited to, the payment transaction request.

The processing module 802 further sends the payment transaction request to the issuer servers 108 for facilitating the payment transactions from the remote device 808. The processing module 802 is further configured to notify the remote device 808 of the transaction status in the form of an authorization response message via the communication module 806. The authorization response message includes but is not limited to, a payment transaction response received from the issuer servers 108. Alternatively, in one embodiment, the processing module 802 is configured to send an authorization response message for declining the payment transaction request, via the communication module 806, to the acquirer servers 110. In one embodiment, the processing module 802 executes similar operations performed by the server system 200, however, for the sake of brevity, these operations are not explained herein.

The disclosed method with reference to FIG. 5, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are within the scope of the disclosed technology. Furthermore, any of the software-based embodiments may be uploaded, downloaded, or remotely accessed through a suitable communication means. Such a suitable communication means include for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad scope of the invention. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media includes any type of tangible storage media.

Examples of non-transitory computer-readable media include magnetic storage media (such as floppy disks, magnetic tapes, hard disk drives, etc.), optical magnetic storage media (e.g. magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different from those which are disclosed. Therefore, although the invention has been described based on these exemplary embodiments, it is noted that certain modifications, variations, and alternative constructions may be apparent and well within the scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:

receiving, by a server system, a payment authorization message associated with an ongoing payment transaction from an issuer server operating in a single message system;

determining, using a machine learning model, a likelihood of an absence of a clearing message for the ongoing payment transaction from an acquirer server operating in a dual message system;

based on the likelihood of the absence of the clearing message, identifying the ongoing payment transaction as a bridged transaction that is unlikely to be cleared by the acquirer server operating in the dual message system with the issuer server operating in the single message system;

extracting, by the server system, a transaction feature set from the ongoing payment transaction;

accessing, by the server system, a historical trend feature set from a database associated with the server system, the historical trend feature set including metrics related to historical bridged transactions associated with the issuer server and the acquirer server;

generating, by one or more clearing prediction models associated with the server system, a clearing score for the ongoing payment transaction based, at least in part, on the transaction feature set and the historical trend feature set, the clearing score indicating a likelihood of the bridged transaction being delayed or failed by the acquirer server operating in the dual message system; and transmitting, by the server system, a hold transaction message to the issuer server operating in the single message system based, at least in part, on the clearing score being lower than a predefined threshold.

2. The computer-implemented method as claimed in claim 1, wherein generating the clearing score comprises:

determining, by at least one model from the one or more clearing prediction models, a transaction clearance likelihood score based, at least in part, on the transaction feature set and a historical authentication feature set from the historical trend feature set;

determining, by at least another model from the one or more clearing prediction models, a transaction dispute likelihood score based, at least in part, on the transaction feature set and a historical dispute feature set from the historical trend feature set; and computing, by the server system, the clearing score based, at least in part, on the transaction clearance likelihood score and the transaction dispute likelihood score.

3. The computer-implemented method as claimed in claim 1, further comprising:

receiving, by the server system, a transaction clearing message for the ongoing payment transaction from the acquirer server; and transmitting, by the server system, a settlement initiation message to the issuer server in response to receiving the transaction clearing message.

4. The computer-implemented method as claimed in claim 1, further comprising:

accessing, by the server system, a historical transaction dataset from the database, the historical transaction dataset comprising transaction-related information associated with a plurality of transactions performed by a plurality of cardholders with a plurality of merchants;

generating, by the server system, the historical trend feature set based, at least in part, on the transaction-related information associated with the plurality of transactions; and storing, by the server system, the historical trend feature set in the database.

5. The computer-implemented method as claimed in claim 1, further comprising:

transmitting, by the server system, a settlement initiation message to the issuer server based, at least in part, on the clearing score being at least equal to the predefined threshold.

6. The computer-implemented method as claimed in claim 5, wherein the hold transaction message and the settlement initiation message are Application Programming Interface (API) messages.

7. The computer-implemented method as claimed in claim 1, wherein the transaction feature set comprises at least one of merchant category, merchant industry, transaction amount, pre-authorization amount, Decision Intelligence (DI) score, card present/card not present indicator, and e-Commerce/recurring/POS transaction indicator.

8. The computer-implemented method as claimed in claim 1, wherein the historical trend feature set comprises a historical authentication feature set and a historical dispute feature set.

9. The computer-implemented method as claimed in claim 1, wherein each model of the one or more clearing prediction models is a decision tree-based Machine Learning model.

10. The computer-implemented method as claimed in claim 1, wherein the server system is a payment server associated with a payment network.

11. A server system, comprising:

a communication interface;

a memory comprising executable instructions; and a processor communicably coupled to the communication interface and the memory, the processor configured to cause the server system to at least:

receive a payment authorization message associated with an ongoing payment transaction from an issuer server operating in a single message system;

determine, using a machine learning model, a likelihood of an absence of a clearing message for the ongoing payment transaction from an acquirer server operating in a dual message system;

based on the likelihood of the absence of the clearing message, identify the ongoing payment transaction as a bridged transaction that is unlikely to be cleared by the acquirer server operating in the dual message system with the issuer server operating in the single message system;

extract a transaction feature set from the ongoing payment transaction;

access a historical trend feature set from a database associated with the server system, the historical trend feature set including metrics related to historical bridged transactions associated with the issuer server and the acquirer server;

generate, by one or more clearing prediction models associated with the server system, a clearing score for the ongoing payment transaction based, at least in part, on the transaction feature set and the historical trend feature set, the clearing score indicating a likelihood of the bridged transaction being delayed or failed by the acquirer server operating in the dual message system; and transmit a hold transaction message to the issuer server operating in the single message system based, at least in part, on the clearing score being lower than a predefined threshold.

12. The server system as claimed in claim 11, wherein to generate the clearing score, the server system is further caused at least to:

determine, by at least one model from the one or more clearing prediction models, a transaction clearance likelihood score based, at least in part, on the transaction feature set and a historical authentication feature set from the historical trend feature set;

determine, by at least another model from the one or more clearing prediction models, a transaction dispute likelihood score based, at least in part, on the transaction feature set and a historical dispute feature set from the historical trend feature set; and compute the clearing score based, at least in part, on the transaction clearance likelihood score and the transaction dispute likelihood score.

13. The server system as claimed in claim 11, wherein the server system is further caused at least to:

access a historical transaction dataset from the database, the historical transaction dataset comprising transaction-related information associated with a plurality of transactions performed by a plurality of cardholders with a plurality of merchants;

generate the historical trend feature set based, at least in part, on the transaction-related information associated with the plurality of transactions; and store the historical trend feature set in the database.

14. The server system as claimed in claim 12, wherein the server system is further caused at least to:

transmit a settlement initiation message to the issuer server based, at least in part, on the clearing score being at least equal to the predefined threshold.

15. The server system as claimed in claim 14, wherein the hold transaction message and the settlement initiation message are Application Programming Interface (API) messages.

16. The server system as claimed in claim 11, wherein the transaction feature set comprises a merchant category, a merchant industry, a transaction amount, a pre-authorization amount, and a Decision Intelligence (DI) score.

17. The server system as claimed in claim 11, wherein the historical trend feature set comprises a historical authentication feature set and a historical dispute feature set.

18. The server system as claimed in claim 11, wherein each model of the one or more clearing prediction models is a decision tree-based Machine Learning model.

19. A non-transitory computer-readable storage medium comprising computer-executable instructions that, when executed by at least a processor of a server system, cause the server system to perform a method comprising:

receiving a payment authorization message associated with an ongoing payment transaction from an issuer server operating in a single message system;

determining, using a machine learning model, a likelihood of an absence of a clearing message for the ongoing payment transaction from an acquirer server operating in a dual message system;

based on the likelihood of the absence of the clearing message, identifying the ongoing payment transaction as a bridged transaction that is unlikely to be cleared by the acquirer server operating in the dual message system with the issuer server operating in the single message system;

extracting a transaction feature set from the ongoing payment transaction;

accessing a historical trend feature set from a database associated with the server system, the historical trend feature set including metrics related to historical bridged transactions associated with the issuer server and the acquirer server;

generating, by one or more clearing prediction models associated with the server system, a clearing score for the ongoing payment transaction based, at least in part, on the transaction feature set and the historical trend feature set, the clearing score indicating a likelihood of the bridged transaction being delayed or failed by the acquirer server operating in the dual message system; and transmitting a hold transaction message to the issuer server operating in the single message system based, at least in part, on the clearing score being lower than a predefined threshold.

20. The non-transitory computer-readable storage medium as claimed in claim 19, wherein the method further comprises:

transmitting a settlement initiation message to the issuer server based, at least in part, on the clearing score being at least equal to the predefined threshold.

* * * * *